(12) United States Patent
Byon et al.

(10) Patent No.: US 12,717,157 B2
(45) Date of Patent: Aug. 25, 2026

(54) CAMERA MODULE AND ELECTRONIC DEVICE INCLUDING THE SAME

(71) Applicant: Samsung Electronics Co., Ltd., Suwon-si (KR)

(72) Inventors: Kwangseok Byon, Suwon-si (KR); Bongchan Kim, Suwon-si (KR); Jaekyu Shim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 264 days.

(21) Appl. No.: 18/668,944

(22) Filed: May 20, 2024

(65) Prior Publication Data

US 2024/0353689 A1 Oct. 24, 2024

Related U.S. Application Data

(63) Continuation of application No. PCT/KR2024/005132, filed on Apr. 17, 2024.

(30) Foreign Application Priority Data

Apr. 24, 2023 (KR) ........................ 10-2023-0053217
Jun. 2, 2023 (KR) ........................ 10-2023-0071392

(51) Int. Cl.
*G02B 27/64* (2006.01)
*G01D 5/14* (2006.01)
(Continued)

(52) U.S. Cl.
CPC ........... *G02B 27/646* (2013.01); *G01D 5/145* (2013.01); *G03B 5/00* (2013.01); *G03B 13/36* (2013.01);
(Continued)

(58) Field of Classification Search
None
See application file for complete search history.

(56) References Cited

U.S. PATENT DOCUMENTS 10,416,472 B2 9/2019 Jeong et al.
2015/0350507 A1 12/2015 Topliss et al.
(Continued)

FOREIGN PATENT DOCUMENTS

CN 109413305 A 3/2019
CN 115079394 A 9/2022
(Continued)

OTHER PUBLICATIONS

European Search Report dated Feb. 24, 2026, issued in European Application No. 24797343.1.
International Search Report dated Aug. 5, 2024, issued in International Application No. PCT/KR2024/005132.

*Primary Examiner* — Michael H Caley
(74) *Attorney, Agent, or Firm* — Jefferson IP Law, LLP

(57) ABSTRACT

At least one camera module disposed in an electronic device is provided. The at least one camera module includes a lens assembly aligned along an optical axis, an image sensor for changing an image to an electrical signal, an optical image stabilization (OIS) driving unit for providing force for the lens assembly or the image sensor to move in a direction perpendicular to the optical axis or to rotate about the optical axis, and a housing for accommodating the lens assembly, the image sensor and the OIS driving unit, wherein the OIS driving unit includes an OIS carrier for moving in the direction perpendicular to the optical axis or rotating about the optical axis, the OIS carrier transports the lens assembly or the image sensor based on the movement of the OIS driving unit, a plurality of first axis drive coils disposed on a first side of the housing, a first magnet having at least two polarities, and disposed on the OIS carrier to face the plurality of the first axis drive coils, at least two first position (Continued)

sensors disposed at coil centers of at least two drive coils respectively among the plurality of the first axis drive coils, and configured to acquire first information for measuring a position of the first magnet for a first axis direction of the OIS driving unit, and at least one second position sensor configured to acquire second information for measuring a position of the first magnet for a second axis direction of the OIS driving unit, and wherein the at least one second position sensor be disposed on the first side of the housing to face one or more neutral zones of the first magnet.

20 Claims, 27 Drawing Sheets

(51) Int. Cl.

| | |
|---|---|
| ***G03B 5/00*** | (2021.01) |
| ***G03B 13/36*** | (2021.01) |
| ***H04N 23/54*** | (2023.01) |
| ***H04N 23/68*** | (2023.01) |

(52) U.S. Cl.

CPC ......... *H04N 23/54* (2023.01); *H04N 23/6812* (2023.01); *G03B 2205/0007* (2013.01); *G03B 2205/0069* (2013.01)

(56) References Cited

U.S. PATENT DOCUMENTS

| | | | | |
|---|---|---|---|---|
| 2016/0004091 | A1 | 1/2016 | Lim et al. | |
| 2016/0085086 | A1 | 3/2016 | Rho et al. | |
| 2017/0329151 | A1 | 11/2017 | Hu et al. | |
| 2019/0058832 | A1 | 2/2019 | Huang et al. | |
| 2020/0106962 | A1 | 4/2020 | Smyth et al. | |
| 2021/0080807 | A1 | 3/2021 | Sharma | |
| 2022/0146852 | A1 | 5/2022 | Yu et al. | |
| 2022/0179286 | A1 | 6/2022 | Yan et al. | |
| 2022/0404577 | A1* | 12/2022 | Su ........................ | H02K 11/215 |

FOREIGN PATENT DOCUMENTS

| | | | |
|---|---|---|---|
| JP | 2019-095540 | A | 6/2019 |
| JP | 2019-102803 | A | 6/2019 |
| KR | 10-2016-0035244 | A | 3/2016 |
| KR | 10-1691161 | B1 | 12/2016 |
| KR | 10-2017-0110298 | A | 10/2017 |
| KR | 10-2018-0024145 | A | 3/2018 |
| KR | 10-2018-0094355 | A | 8/2018 |
| KR | 10-2019-0061439 | A | 6/2019 |
| KR | 10-2021-0044871 | A | 4/2021 |

* cited by examiner

CAMERA MODULE AND ELECTRONIC DEVICE INCLUDING THE SAME

CROSS-REFERENCE TO RELATED APPLICATION(S)

This application is a continuation application, claiming priority under § 365 (c), of an International application No. PCT/KR2024/005132, filed on Apr. 17, 2024, which is based on and claims the benefit of a Korean patent application number 10-2023-0053217, filed on Apr. 24, 2023, in the Korean Intellectual Property Office, and of a Korean patent application number 10-2023-0071392, filed on Jun. 2, 2023, in the Korean Intellectual Property Office, the disclosure of each of which is incorporated by reference herein in its entirety.

TECHNICAL FIELD

The disclosure relates to a camera module and an electronic device including the same.

BACKGROUND ART

As it is general to carry a portable electronic device along in daily life, using a camera of the portable electronic device significantly increases, and shooting using the portable electronic device is considered as an indispensable function such that the camera function becomes as a criterion for selecting the portable electronic device. In recent, the camera function implemented in the portable electronic device advances, and techniques for acquiring a clear image in various shooting environment are applied. For example, an optical image stabilizer (OIS) technique for compensating for shaking in the shooting and an auto focus (AF) technique for automatically adjusting a focus on a subject may be employed.

The above information is presented as background information only to assist with an understanding of the disclosure. No determination has been made, and no assertion is made, as to whether any of the above might be applicable as prior art with regard to the disclosure.

DISCLOSURE

Technical Solution

Aspects of the disclosure are to address at least the above-mentioned problems and/or disadvantages and to provide at least the advantages described below. Accordingly, an aspect of the disclosure is to provide a camera module and an electronic device including the same.

Additional aspects will be set forth in part in the description which follows and, in part, will be apparent from the description, or may be learned by practice of the presented embodiments.

In accordance with an aspect of the disclosure, at least one camera module disposed in an electronic device is provided. The at least one camera module includes a lens assembly aligned along an optical axis, an image sensor for changing an image to an electrical signal, an optical image stabilization (OIS) driving unit for providing force for the lens assembly or the image sensor to move in a direction perpendicular to the optical axis or to rotate about the optical axis, and a housing for accommodating the lens assembly, the image sensor and the OIS driving unit, wherein the OIS driving unit includes an OIS carrier for moving in the direction perpendicular to the optical axis or rotating about the optical axis, the OIS carrier transports the lens assembly or the images sensor based on the movement of the OIS driving unit, a plurality of first axis drive coils disposed on a first side of the housing, a first magnet having at least two polarities, and disposed on the OIS carrier to face the plurality of the first axis drive coils, at least two first position sensors disposed at coil centers of at least two drive coils respectively among the plurality of the first axis drive coils, and configured to acquire first information for measuring a position of the first magnet for a first axis direction of the OIS driving unit, and at least one second position sensor configured to acquire second information for measuring a position of the first magnet for a second axis direction of the OIS driving unit, and wherein the at least one second position sensor is disposed on the first side of the housing to face one or more neutral zones of the first magnet.

In accordance with another aspect of the disclosure, an electronic device is provided. The electronic device includes at least one camera module, wherein the at least one camera module includes a lens assembly aligned along an optical axis, an image sensor for changing an image to an electrical signal, an OIS driving unit for providing force for the lens assembly or the image sensor to move in a direction perpendicular to the optical axis or to rotate about the optical axis, and a housing for accommodating the lens assembly, the image sensor and the OIS driving unit, wherein the OIS driving unit includes an OIS carrier for moving in the direction perpendicular to the optical axis or rotating about the optical axis, the OIS carrier transports the lens assembly or the image sensor based on the movement of the OIS driving unit, a plurality of first axis drive coils disposed on a first side of the housing, a first magnet having at least two polarities, and disposed on the OIS carrier to face the plurality of the first axis drive coils, at least two first position sensors disposed at coil centers of at least two drive coils respectively among the plurality of the first axis drive coils, and configured to acquire first information for measuring a position of the first magnet for a first axis direction of the OIS driving unit, at least one second axis drive coil disposed on a second side of the housing perpendicular to the first side, a second magnet having at least one polarity, and disposed on the OIS carrier to face the at least one second axis drive coil, and at least one second position sensor configured to acquire second information for measuring the position of the first magnet for a second axis direction of the OIS driving unit, and wherein the at least one second position sensor is disposed on the first side of the housing to face one or more neutral zones of the first magnet.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE FOR INVENTION

Figure 1:
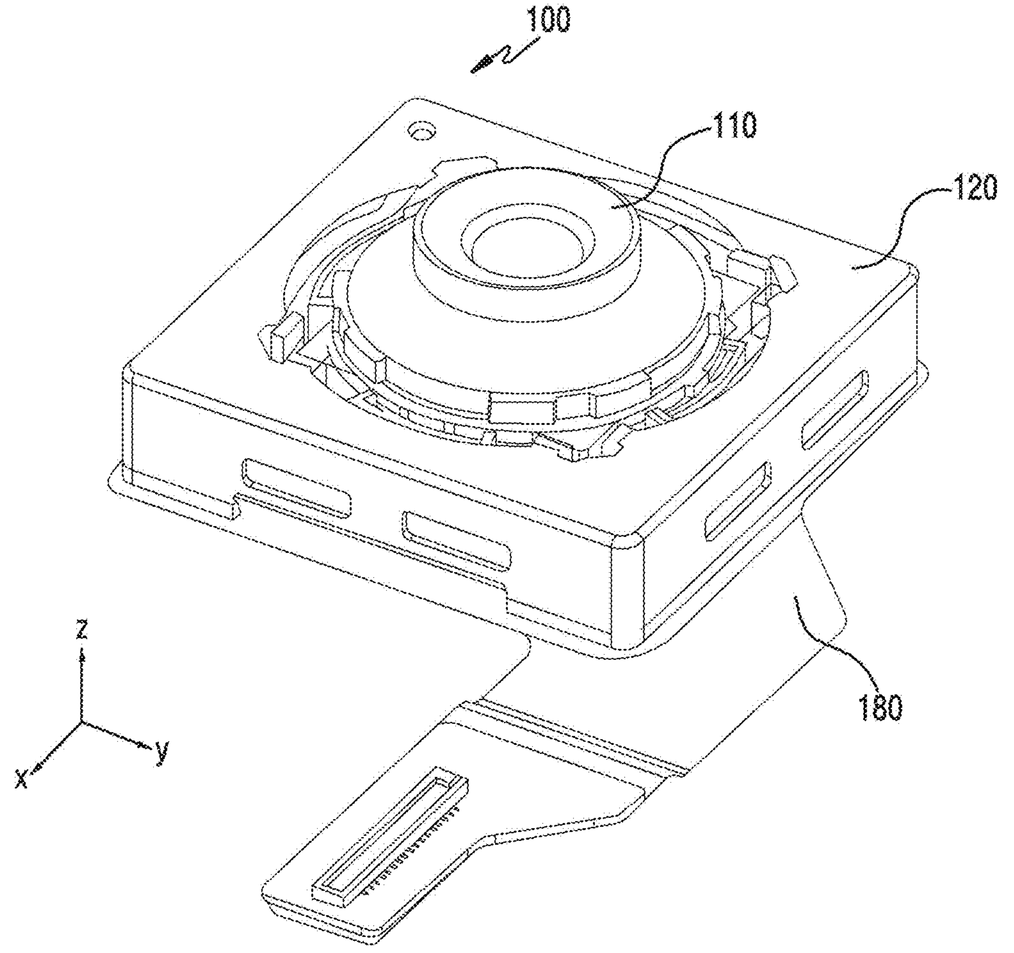
FIG. 1 is a diagram illustrating an exterior of a camera module according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory or the one or more computer programs may be divided with different portions stored in different multiple memories.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

An optical image stabilization (OIS) function of a camera may indicate a function for acquiring a more stabilized image, by driving a lens (e.g., a lens assembly 110 or 810) or an image sensor in response to a movement of the camera (or an electronic device including the camera) in photographing. For example, the camera may control to move the lens or the image sensor in two axes (e.g., an OIS X axis, an OIS Y axis) substantially perpendicular to an optical axis or to rotate about the optical axis (e.g., a Z axis). To control the rotation about the optical axis, an OIS structure of a ball bearing type which mechanically suppresses the rotation by applying a ball guide (or a middle guide) for each axis, or an OIS structure of a suspension wire type which minimizes the rotation by symmetrically arranging a driving unit and a spring tension of each axis may be adopted, but these OIS structures may increase the camera module in size due to design constraints and deteriorate product slimness. To address the design constraints of the camera module, a structure for removing the ball guide or arranging the driving unit of each axis in an asymmetric manner may be adopted. In this case, a 3-axis OIS structure may be applied for the rotation control about the optical axis, but crosstalk may occur on each OIS axis in auto focus (AF) driving, thus degrading position sensing accuracy or causing minute image shaking.

Various embodiments of the disclosure may, if applying the OIS structure with the ball guide (or the middle guide) removed, reduce the crosstalk of other axis driving, by arranging position sensors required for the driving control of OIS three axes (e.g., the OIS X axis, the OIS Y axis, the OIS Z rotation axis (optical axis)) at positions facing the same magnet (e.g., an OIS X axis magnet). Various embodiments of the disclosure may reduce the crosstalk and mitigate magnetic interference in the AF driving and acquire an image of a clearer image quality, by separately measuring and controlling positions of a drive coil and a magnet of one axis (e.g., the OIS X axis) substantially perpendicular to the optical axis using two or more position sensors, and arranging a position sensor of the other axis (e.g., the OIS Y axis) substantially perpendicular to the optical axis at a polarized position (e.g., a neutral zone of an OSI X axis magnet) of the one axis (e.g., the OIX X axis) magnet to control the rotation about the optical axis.

Technical problems to achieve in this document may not be limited to the above-mentioned technical problems, and other technical problems which are not mentioned may be clearly understood through the following descriptions by those skilled in the art to which this document pertains.

FIG. 1 is a diagram illustrating an exterior of a camera module according to an embodiment of the disclosure.

Figure 2:
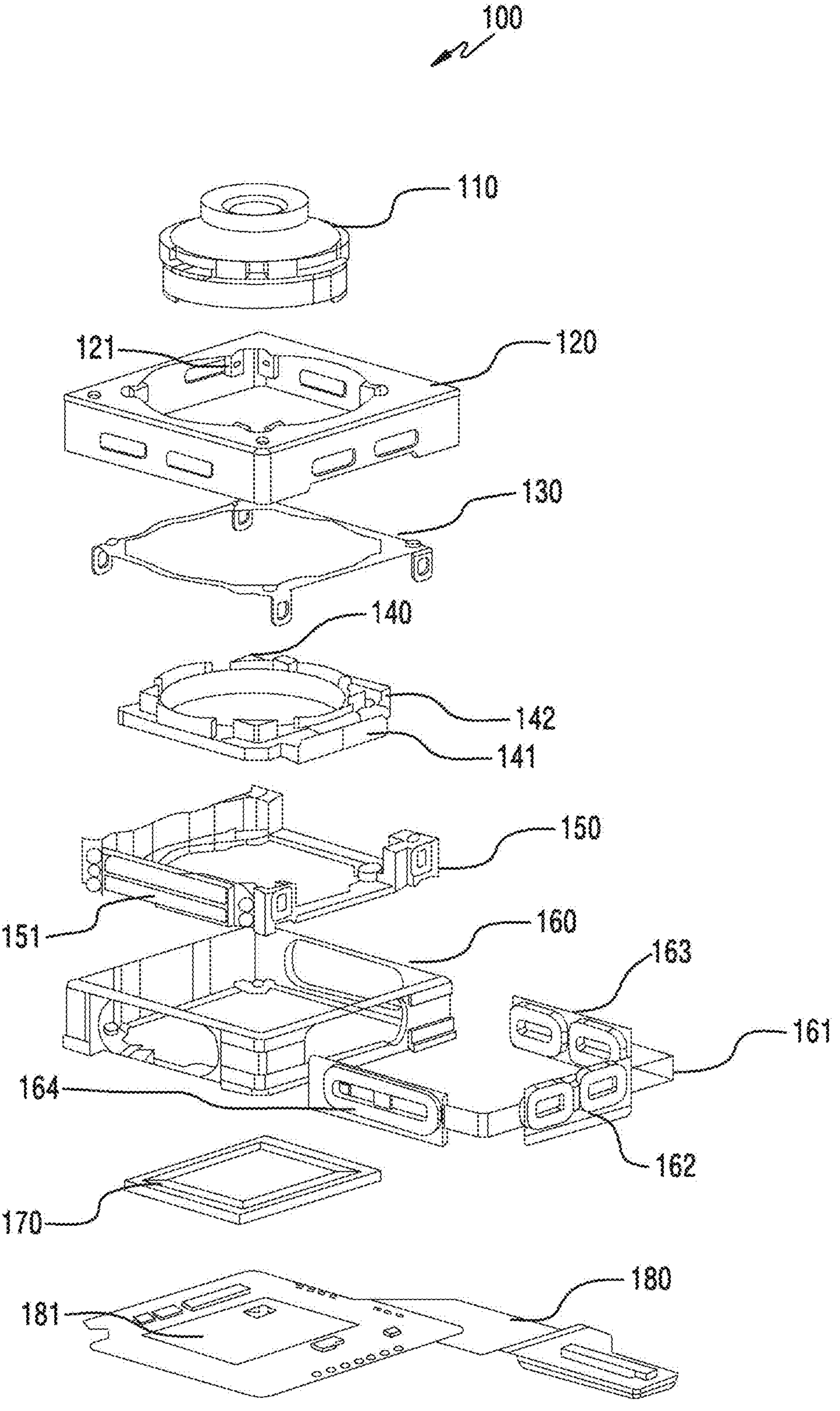
FIG. 2 is an exploded perspective view of a camera module according to an embodiment of the disclosure.

FIG. 2 is an exploded perspective view of a camera module according to an embodiment of the disclosure.

Figure 3:
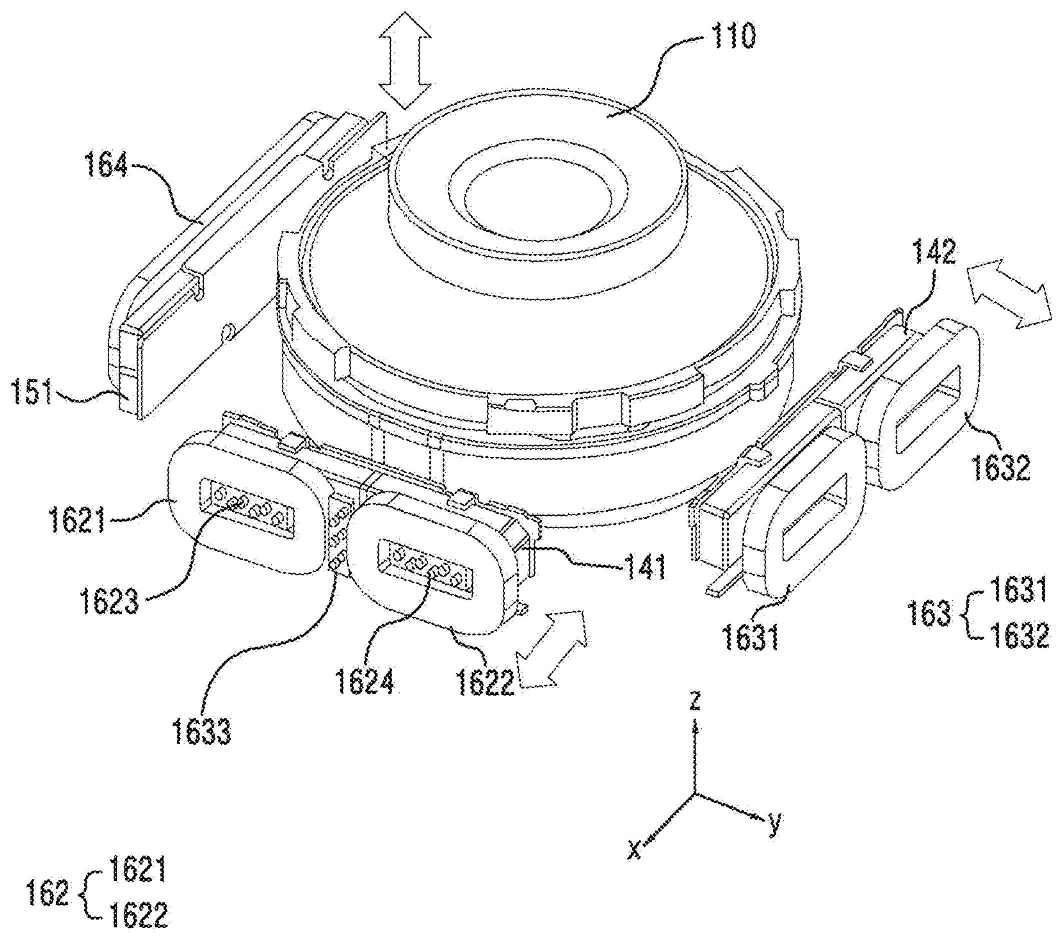
FIG. 3 is a perspective view of a lens assembly and an optical image stabilizer (OIS) driving unit of a camera module according to an embodiment of the disclosure.

FIG. 3 is a perspective view of a lens assembly and an optical image stabilizer (OIS) driving unit of a camera module according to an embodiment of the disclosure.

Figure 17:
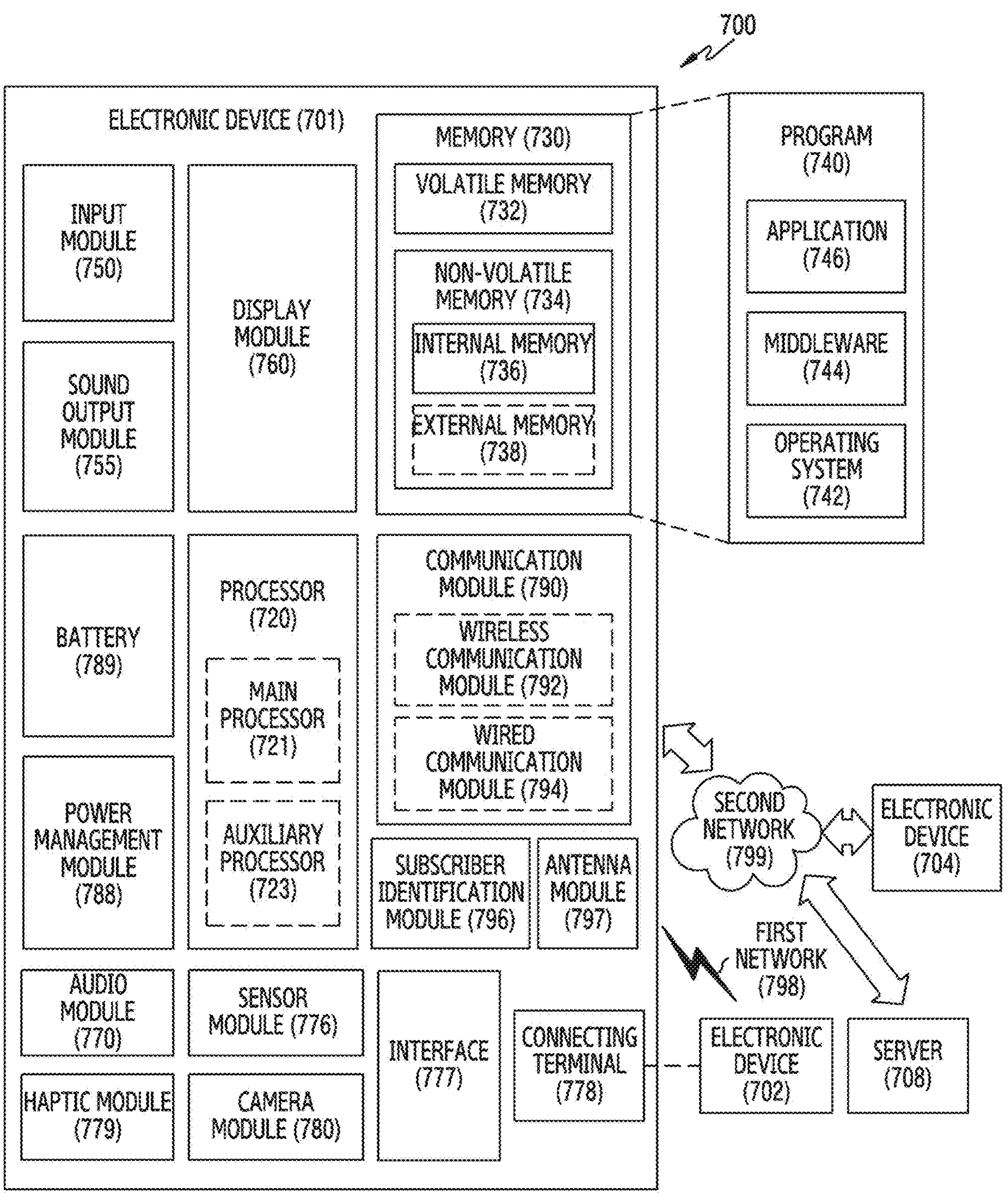
FIG. 17 is a block diagram of an electronic device in a network environment, according to an embodiment of the disclosure.

In an embodiment, at least one or more camera modules 100 may be disposed in a front region and/or a rear region of an electronic device (e.g., an electronic device 701 of FIG. 17).

Referring to FIGS. 1 and 2, the camera module 100 may include a lens assembly 110, a shield can 120, a stopper 130, an OIS carrier 140, an AF carrier 150, a housing 160, and/or a printed circuit board 180. However, the configuration of the camera module 100 is not limited thereto, and at least one of the aforementioned components may be omitted or one or more other components may be added. For example, the camera module 100 may further include an image sensor 181 disposed on one side of the printed circuit board 180.

In an embodiment, the lens assembly 110 may include one or more lenses for projecting an image of a subject onto the image sensor 181 using incident light from outside. The lens assembly 110 may move in a forward/backward direction along the optical axis, and change a focal position to acquire an image of clearer image quality of the subject.

In an embodiment, the shield can 120 may be configured to cover the camera module 100 from top to bottom as a whole. For example, the shield can 120 may include an upper face, and sides disposed perpendicularly to edges of the upper face, and a lower face may be opened. An opening in a designated size may be formed to expose a part of the lens assembly 110 to outside, in a center portion of the upper face of the shield can 120. A plurality of OIS stoppers 121 for preventing separation of the OIS carrier 140 may be disposed at each cover of the sides of the shield can 120. The OIS stopper 121 may be formed with an elastic material to mitigate impact due to collision with the OIS carrier 140. According to various embodiments, the shield can 120 may be formed with a metal material or a material (e.g., reinforced plastic) having hardness over a designated level to protect other components (e.g., the stopper 130, the OIS carrier 140, the AF carrier 150, the housing 160, the printed circuit board 180 and/or the image sensor 181) of the camera module 100.

In an embodiment, the stopper 130 may be disposed between the shield can 120 and the OIS carrier 140, to prevent the OIS carrier 140 from deviating in one direction (e.g., an optical axis direction or an upward direction). An opening in a designated size may be formed to allow optical axis forward/backward direction movement of the lens assembly 110, in a center portion of the stopper 130.

In an embodiment, the OIS carrier 140 may accommodate at least a portion of the lens assembly 110. For example, the OIS carrier 140 may be configured to surround the lens assembly 110. The OIS carrier 140 may include a first side, a third side facing the first side, a second side perpendicular to the first side and the third side, and a fourth side facing the second side. In an embodiment, a first magnet 141 for the OIS driving may be fixed to outer sides of at least two of the four sides (e.g., the first side, the second side, the third side, the fourth side) of the OIS carrier 140. In an embodiment, an opening may be formed in a designated size to allow the optical axis forward/backward direction movement of the lens assembly 110, in a center portion of the OIS carrier 140. In FIG. 2, the first magnet 141 is disposed on one side of the OIS carrier 140, which is not limited thereto. For example, one or more OIS drive coils 162 and 163 may be disposed on the sides of the OIS carrier 140. In FIG. 2, the first magnet 141 is disposed on each side of the OIS carrier 140, but the number of the OIS magnets (e.g., the first magnet 141 and the second magnet 142) may not be limited thereto.

In an embodiment, the AF carrier 150 may move the lens assembly 110 in the optical axis direction for the AF control. For example, the AF carrier 150 includes an opening of a designated size for accommodating at least a portion of the lens assembly 110 at its center portion, and may be coupled with the lens assembly 110 through the opening. The AF carrier 150 may include a first side, a third side facing the first side, a second side perpendicular to the first side and the third side, and a fourth side facing the second side. In an embodiment, an AF magnet 151 for the AF driving may be fixed to an outer side of at least one of the four sides (e.g., the first side, the second side, the third side, the fourth side) of the AF carrier 150. In FIG. 2, the AF magnet 151 is disposed on one outer side of the AF carrier 150, which is not limited thereto. For example, an AF drive coil 164 may be disposed on one outer side of the AF carrier 150.

In an embodiment, the housing 160 may be configured to accommodate at least a portion of the lens assembly 110, the stopper 130, the OIS carrier 140 and/or the AF carrier 150. The housing 160 is opened in an upper face and a lower face, and may include one or more sides disposed to surround the above components (e.g., at least a portion of the lens assembly 110, the stopper 130, the OIS carrier 140 and/or the AF carrier 150). For example, the housing 160 may include a first side, a third side facing the first side, a second side perpendicular to the first side and the third side, and a fourth side facing the second side. In an embodiment, the housing 160 may be coupled with a printed circuit board assembly 161 formed to surround at least a part of the sides of the housing 160. The printed circuit board assembly 161 may include a flexible printed circuit board (FPBC). In an embodiment, the printed circuit board assembly 161 may include the first axis drive coil 162 and the second axis drive coil 163 for the OIS driving and the AF drive coil 164 for the AF driving. The first axis drive coil 162, the second axis drive coil 163 and the AF drive coil 164 may be disposed on the printed circuit board assembly 161 to generate electromagnetic force to the OIS magnets (i.e., the first magnet 141 and the second magnet 142) and the AF magnet 151 while the camera module 100 is assembled. For example, the first axis drive coil 162 may be disposed on one side of the housing 160 facing the first magnet 141 fixed to the OIS carrier 140. As another example, the AF drive coil 164 may be disposed on one side of the housing 160 facing the AF magnet 151 fixed to the AF carrier 150.

In the disclosure, the OIS carrier 140, the first magnet 141 disposed on the OIS carrier 140, and the first axis drive coil 162 and the second axis drive coil 163 for the OIS driving may be referred to as an OIS driving unit. The OIS driving unit may further include position sensors for position measurement and driving control for each OIS axis. In an embodiment, the OIS driving unit may be disposed in assembly as shown in FIG. 3. In an embodiment, if the first axis drive coil 162 for OIS first axis (e.g., OIS X axis) driving is disposed on the first side of the housing 160, the first magnet 141 used for the OIS first axis driving may be disposed at a position facing the first axis drive coil 162 in the sides of the OIS carrier 140. According to various embodiments, the first axis drive coil 162 may be divided into two drive coils (e.g., a first drive coil 1621 and a second drive coil 1622) to control rotation driving about the optical axis, and accordingly the first magnet 141 may be configured to have two polarities on a side facing the two drive coils. A first position sensor a 1623 and a first position sensor b 1624 for controlling the OIS first axis driving may be disposed, in an inner side (e.g., a center of the coil) of the first drive coil 1621 and the second drive coil 1622 respectively. For example, the first position sensor a 1623 and the first position sensor b 1624 may be hall sensors. The first position sensor a 1623 and the first position sensor b 1624 may measure an OIS first axis direction position of the first magnet 141 at their position, and perform feedback control by applying a current to the first drive coil 1621 and the second drive coil 1622 based on their measured position. For example, if controlling the current applied to the first drive coil 1621 and the second drive coil 1622 by designating the same position, the first position sensor a 1623 and the first position sensor b 1624 may maintain the OIS carrier 140 not to rotate. As another example, if controlling the current applied to the first drive coil 1621 and the second drive coil 1622 by designating different positions, the first position sensor a 1623 and the first position sensor b 1624 may rotate the OIS carrier 140 at an angle of $$\tan^{-1}\left(\frac{\Delta x}{l}\right).$$

Herein, Δx may denote a difference in the x-axis direction of the different positions designated at each position sensor, and l may denote a length between the first position sensor a 1623 and the first position sensor b 1624. According to various embodiments, the first drive coil 1621 and the second drive coil 1622 may be controlled by at least one OSI first axis drive circuit (not shown) electrically connected with the first drive coil 1621, the second drive coil 1622, the first position sensor a 1623 and the first position sensor b 1624, and in this case, the at least one OSI first axis drive circuit (not shown) may be embedded in at least one of the first position sensor a 1623 or the first position sensor b 1624, or may be configured as a separate module independent from these position sensors. FIG. 3 shows that the OIS first axis drive coil 162 is divided into the two drive coils (e.g., the first drive coil 1621, the second drive coil 1622) and the first position sensor a 1623 and the first position sensor b 1624 are disposed at the coil center portion of the two drive coils 1621 and 1622 respectively, but the number and the arrangement of the drive coils and the position sensors may not be limited thereto.

In an embodiment, if the second axis drive coil 163 for OIS second axis (e.g., OIS Y axis) driving is disposed on the second side of the housing 160 perpendicular to the first side, the second magnet 142 used for the OIS second axis driving may be disposed at a position facing the second axis drive coil 163 in the sides of the OIS carrier 140. According to various embodiments, the second magnet 142 may be configured to have two polarities to reduce leakage the magnitude of the magnetic flux generating in the magnet, and accordingly the second axis drive coil 163 may be divided into two drive coils (e.g., a third drive coil 1631 and a fourth drive coil 1632). A second position sensor 1633 for controlling the OIS second axis driving may be disposed to face a neutral zone of the first magnet 141. The neutral zone of the first magnet 141 may indicate a region in which the first magnet 141 configured to have a plurality of polarities offsets different polarities and does not exhibit any polarity. If the second position sensor 1633 is disposed on an inner side (e.g., a coil center) of at least one drive coil (e.g., the third drive coil 1631 or the fourth drive coil 1632) of the second axis drive coil 163, crosstalk may occur due to other axis driving (e.g., the AF driving or the OIS first axis driving) and thus affect the OIS second axis driving. To prevent OIS compensation performance from being degraded by the crosstalk, the second position sensor 1633 may be disposed on substantially the same side as the first position sensor a 1623 and the first position sensor b 1624. For example, the second position sensor 1633 may be a hall sensor. The second position sensor 1633 may measure an OIS second axis direction position of the first magnet 141, and perform feedback control by applying a current to the third drive coil 1631 and/or the fourth drive coil 1632 based on its measured position. According to various embodiments, the third drive coil 1631 and the fourth drive coil 1632 may be controlled by at least one OSI second axis drive circuit (not shown) electrically connected to the third drive coil 1631, the fourth drive coil 1632, and the second position sensor 1633, and in this case, the at least one OSI second axis drive circuit (not shown) may be embedded in the second position sensor 1633, or may be configured as a separate module independent from the second position sensor 1633. FIG. 3 shows that the OIS second axis drive coil 163 is divided into the two drive coils 1631 and 1632 and one second position sensor 1633 is disposed at the position facing the neutral zone of the first magnet 141, but the number of the drive coils and the position sensors may not be limited thereto.

In an embodiment, the camera module 100 may perform the stabilization function of the image acquired by the image sensor 181, using the one or more OIS drive coils 162 and 163 disposed on the housing 160 and the one or more OIS magnets (i.e., the first magnet 141 and the second magnet 142) fixed to the OIS carrier 140. For example, if the current is applied to the OIS first axis drive coil 162 and/or the OIS second axis drive coil 163, the lens assembly 110 and the OIS carrier 140 including the lens assembly 110 may move on a plane substantially vertical to the optical axis or rotate based on the optical axis by electromagnetic interaction between the OIS first axis drive coil 162 and the first magnet 141 and/or electromagnetic interaction between the OIS second axis drive coil 163 and the second magnet 142. The camera module 100 may move at least a portion of the lens assembly 110 and the OIS carrier 140 in a direction substantially vertical to the optical axis or rotate them about the optical axis using the electromagnetic force between the coil and the magnet.

In an embodiment, if the AF drive coil 164 for the AF driving is disposed on the fourth side perpendicular to the first side and facing the second side, the AF magnet 151 used in the AF driving may be disposed at a position facing the AF drive coil 164 in the sides of the AF carrier 150. A third position sensor (not shown) for measuring the position of the AF carrier 150 (or, the AF magnet 151), and controlling the AF driving may be disposed, on an inner side (e.g., the center of the coil) or an outer side (e.g., an outer circumference of the coil) of the AF drive coil 164. For example, the third position sensor may be a hall sensor. In an embodiment, the camera module 100 may perform the AF control in relation to the image acquired by the image sensor 181, using the AF drive coil 164 disposed in the housing 160 and the AF magnet 151 fixed to the AF carrier 150. For example, if the current is applied to the AF drive coil 164, the lens assembly 110 and the AF carrier 150 including the lens assembly 110 may move along a direction (e.g., a Z axis direction) parallel to the optical axis by electromagnetic interaction between the AF drive coil 164 and the AF magnet 151. The camera module 100 may move the lens assembly 110 and the AF carrier 150 in the optical axis direction using electromagnetic interaction between the AF drive coil 164 and the AF magnet 151.

In an embodiment, an infrared (IR) filter assembly 170 may be disposed on a path transmitting to the image sensor 181 an optical signal of the subject incident through the lens assembly 110, to remove near-infrared wavelengths from the optical signal of the subject.

In an embodiment, the image sensor 181 may be disposed on an upper face of the printed circuit board 180 (e.g., a printed circuit board (PCB), a printed board assembly (PBA), an FPCB, or a rigid-flexible PCB (RFPCB)) of the camera module 100. The image sensor 181 may be electrically connected by a connector with an image signal processor (e.g., an image signal processor 860 of FIG. 18) connected to the printed circuit board 180. The connector may use an FPCB, a cable, or the like. According to various embodiments, the image sensor 181 may be a complementary metal oxide semiconductor (CMOS) sensor or a charged coupled device (CCD) sensor. A plurality of individual pixels may be integrated in the image sensor 181, and each individual pixel may include a micro lens, a color filter, and a photodiode. Each individual pixel is a kind of a photodetector and may convert incident light into an electrical signal. The photodetector may include a photodiode.

Figure 4A:
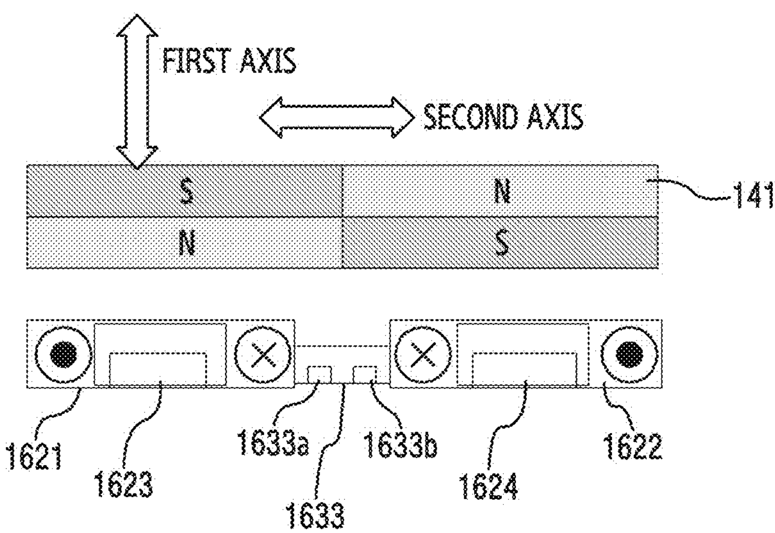
FIG. 4A is a diagram illustrating an arrangement of a first axis drive coil, a first magnet and position sensors according to an embodiment of the disclosure.

FIG. 4A is a diagram illustrating an arrangement of a first axis drive coil, a first magnet and position sensors according to an embodiment of the disclosure.

Figure 4B:
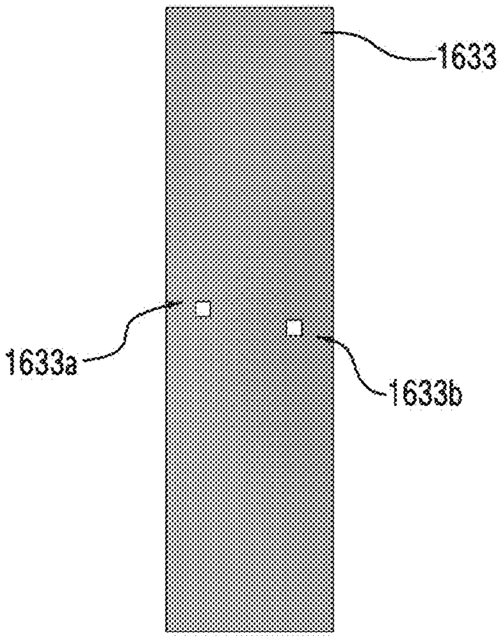
FIG. 4B is a diagram illustrating an arrangement of sensing elements included in a position sensor for measuring an OIS second axis direction position according to an embodiment of the disclosure.

FIG. 4B is a diagram illustrating an arrangement of sensing elements included in a position sensor for measuring an OIS second axis direction position according to an embodiment of the disclosure.

Referring to FIG. 4A, the first axis drive coil 162 for the OSI first axis (e.g., OIS X axis) driving may include two drive coils (e.g., the first drive coil 1621 and the second drive coil 1622) to control the rotation driving about the optical axis, and the first magnet 141 may be configured to have two polarities. The first position sensor a 1623 may be disposed at the coil center of the first drive coil 1621, and the first position sensor b 1624 may be disposed at the coil center of the second drive coil 1622. The first position sensor a 1623 and the first position sensor b 1624 may detect a distance (e.g., the OIS first axis direction position) from the first magnet 141, and perform the feedback control corresponding to the detected distance by applying the current to the first drive coil 1621 and the second drive coil 1622. According to various embodiments, the numbers of the drive coils and the position sensors for the OIS first axis driving are not limited thereto, and a plurality of drive coils and position sensors exceeding 2 may be used for the OIS first axis driving. The first magnet 141 for the OIS first axis driving may be disposed to face the first drive coil 1621 and the second drive coil 1622. Hence, if the current is applied to the first drive coil 1621 and/or the second drive coil 1622, electromagnetic force may occur at the first magnet 141 and the OIS carrier 140 may move in the OIS first axis direction or rotate about the optical axis.

In an embodiment, the second position sensor 1633 for the OIS second axis driving may be disposed between the first drive coil 1621 and the second drive coil 1622. For example, the second position sensor 1633 may be disposed to face the neutral zone in which different polarities are offset in the first magnet 141. The second position sensor 1633 may include two or more sensing elements 1633*a* and 1633*b* therein, and detect the OIS second axis direction position using these sensing elements 1633*a* and 1633*b*.

Referring to FIG. 4B, to increase OSI compensation accuracy, the sensing elements 1633*a* and 1633*b* may be disposed at designated positions inside the second position sensor 1633. For example, the sensing elements 1633*a* and 1633*b* may be disposed at the same distance away from the center of the second position sensor 1633. Even though the distance of each sensing element 1633*a* and 1633*b* from the center of the second position sensor 1633 is different, the OIS second axis direction position may be measured by considering the position of each sensing element 1633*a* and 1633*b*. By performing sum/diff estimation on an output of the first sensing element 1633*a* and an output of the second sensing element 1633*b*, the second position sensor 1633 may reduce the crosstalk of the magnetic flux change due to other axis movement and further offset a change caused by temperature.

Figure 5A:
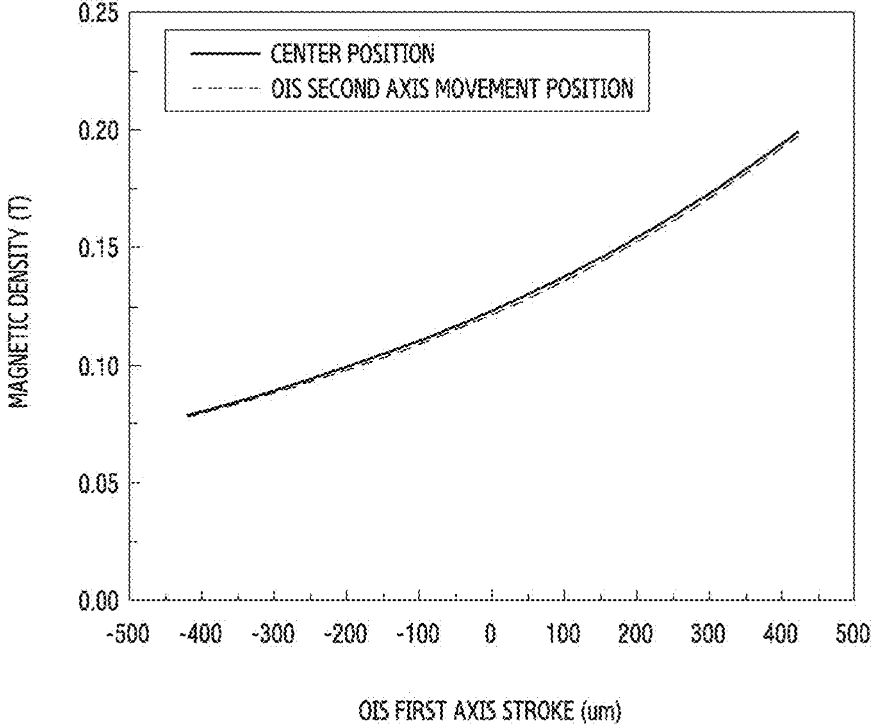
FIGS. 5A and 5B are graphs illustrating variation of a magnetic flux density in OIS first axis driving, according to various embodiments of the disclosure.
Figure 5B:
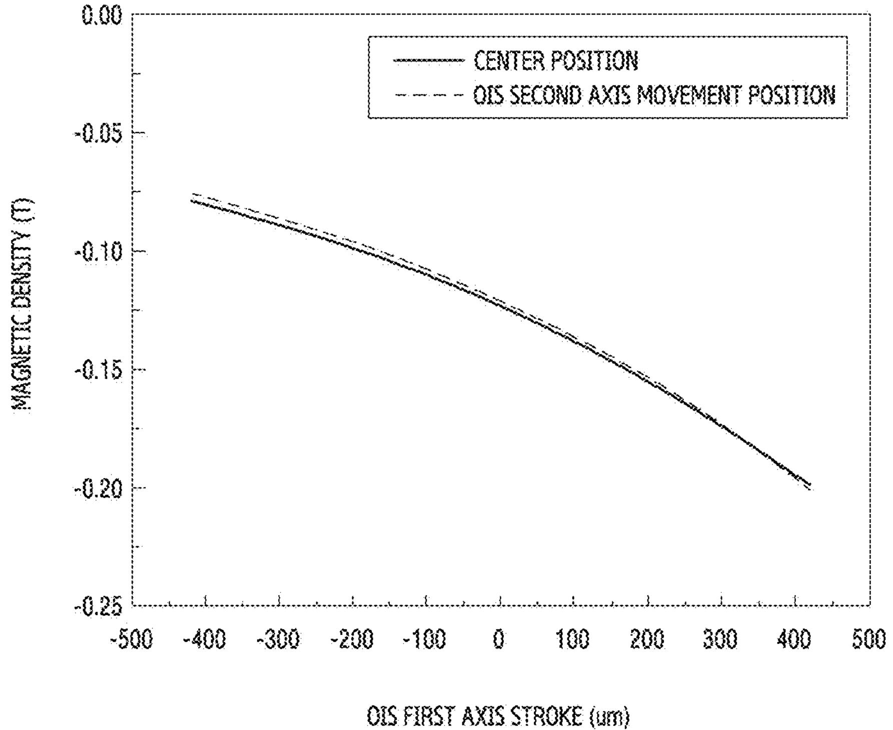

FIGS. 5A and 5B are graphs illustrating magnetic flux density variation of a first magnet 141 measured from a first position sensor (e.g., the first position sensor a 1623, and the first position sensor b 1624) in OIS first axis driving, according to various embodiments of the disclosure.

FIG. 5A may show the magnetic flux density change measured at the first position sensor a 1623, and FIG. 5B may show the magnetic flux density change measured at the first position sensor b 1624.

Referring to FIGS. 5A and 5B, a solid line graph may represent the magnetic flux density change measured while the first magnet 141 maintains the center position and the neutral zone of the first magnet 141 is aligned to face the second position sensor 1633, and a dotted line graph may represent the magnetic flux density change measured while the first magnet 141 moves a specific distance in the OIS second axis direction. The first position sensor a 1623 and the first position sensor b 1624 both may obtain the output in a similar pattern to maintaining the center position even if the magnetic flux density is measured with the first magnet 141 moved to maximum in the OIS second axis direction.

In an embodiment, the first position sensor a 1623 and the first position sensor b 1624 may continuously detect the magnetic flux density of the first magnet 141 at each position, and identify the distance (e.g., the OIS first axis direction position) to the first magnet 141 based on the magnetic flux density variation detected for the first magnet 141 at each position.

Figure 6A:
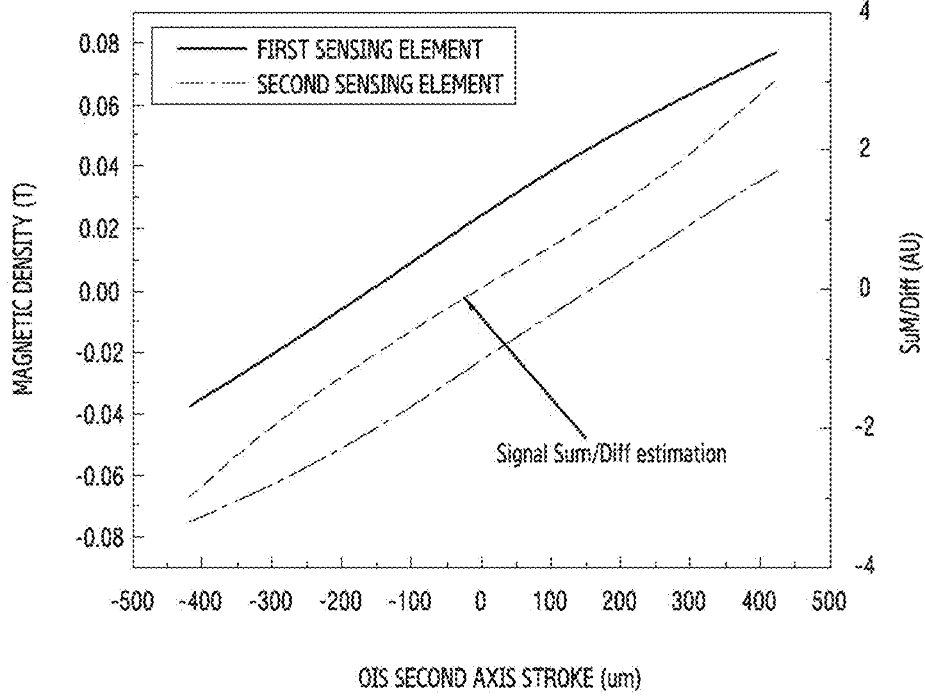
FIG. 6A is a graph illustrating variation of a magnetic flux density in OIS second axis driving, according to an embodiment of the disclosure.

FIG. 6A is a graph illustrating magnetic flux density variation of a first magnet measured from a second position sensor in OIS second axis driving according to an embodiment of the disclosure.

Figure 6B:
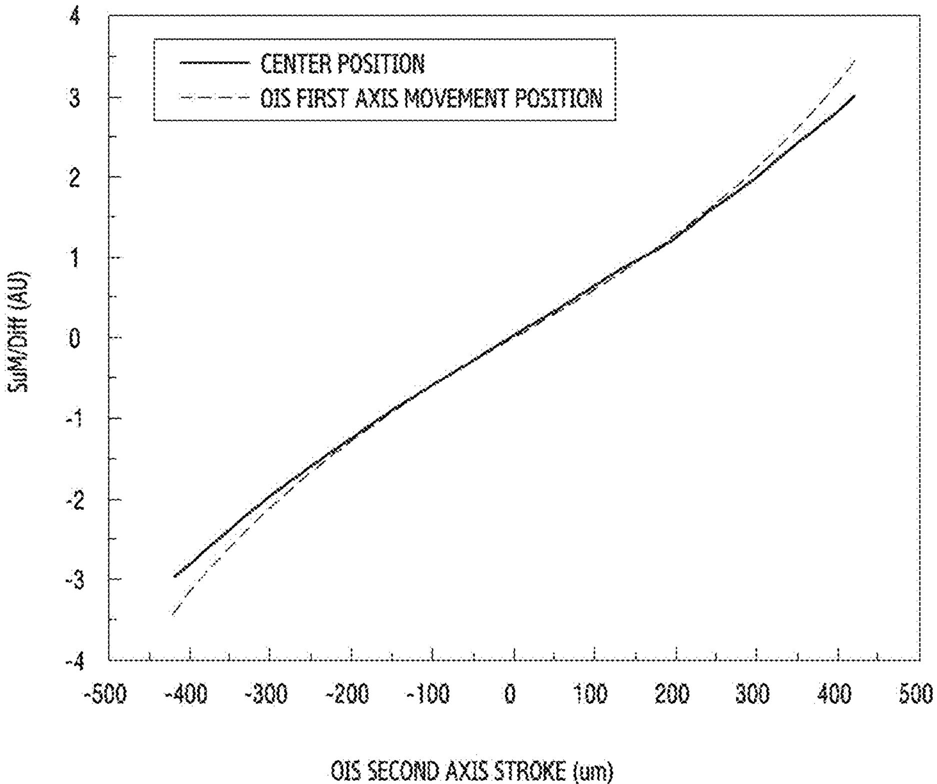
FIG. 6B is a graph for comparing measurement results of a center position and a maximum movement position of an OIS first axis direction in OIS second axis driving, according to an embodiment of the disclosure.

FIG. 6B is a graph comparing measurement results of a center position and a maximum movement position of an OIS first axis direction in the OIS second axis driving according to an embodiment of the disclosure.

FIG. 6A may represent the magnetic flux density change measured at the first sensing element 1633*a* of the second position sensor 1633, and represent the magnetic flux density change measured at the second sensing element 1633*b* of the second position sensor 1633. The second position sensor 1633 may acquire a resulting signal of the magnetic flux density change in the OIS second axis driving by performing the sum/diff estimation on the output signal of the first sensing element 1633*a* and the output signal of the second sensing element 1633*b* as shown in Equation 1, to reduce the crosstalk of the magnetic flux change in the other axis driving.

$$OIS\ Y \text{ positional signal} = \frac{(Hall\ Y1 + Hall\ Y2)}{(Hall\ Y1 - Hall\ Y2)} \quad \text{Equation 1}$$

In Equation 1, Hall Y1 may be the magnetic flux density detected at the first sensing element 1633*a*, and Hall Y2 may be the magnetic flux density detected at the second sensing element 1633*b*.

In an embodiment, the second position sensor 1633 may apply the sum/diff estimation on the magnetic flux density outputs detected from the first sensing element 1633*a* and the second sensing element 1633*b*, and identify the OIS second axis direction position based on their result value.

Referring to FIG. 6B, a solid line graph may represent the result signal while the first magnet 141 maintains the center position of the OIS first axis direction, and a dotted line graph may represent the result signal while the first magnet 141 moves the maximum distance in the OIS first axis direction. As a result of comparing the two result signals, they almost match except for both ends, and accordingly insignificant crosstalk according to the other axis driving may be identified.

FIGS. 7 through 10 are perspective views illustrating a lens assembly and an OIS driving unit of a camera module according to various embodiments of the disclosure.

Referring to FIGS. 7 through 10, the OIS driving unit is modified from the arrangement of the OIS driving unit shown in FIG. 3, and its basic structure may be similar. The same terms are used for components which are the same as or substantially the same as those described above, and redundant explanation thereof is omitted hereafter.

Figure 7:
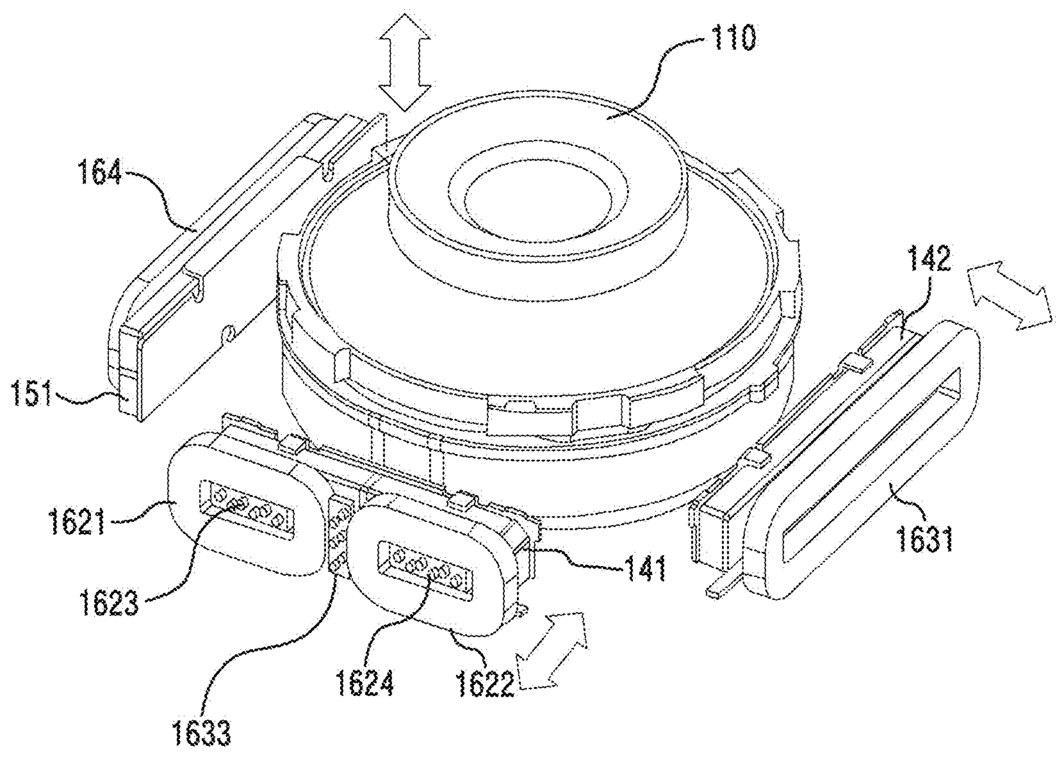
FIGS. 7, 8, 9 and 10 are perspective views illustrating a lens assembly and an OIS driving unit of a camera module according to various embodiments of the disclosure.

Referring to FIG. 7, in an embodiment, the second axis drive coil 163 for the OIS second axis (e.g., OIS Y axis) driving may include one drive coil, and accordingly the polarity of the side corresponding to the second axis drive coil 163 may include one pole (e.g., any one of the N pole or the S pole). In this case, since the magnitude of the leakage magnetic flux is considerable compared to the second magnet 142 having two poles in FIG. 3, its application may be limited if a periphery component is sensitive to the effect from the magnetic body.

Figure 8:
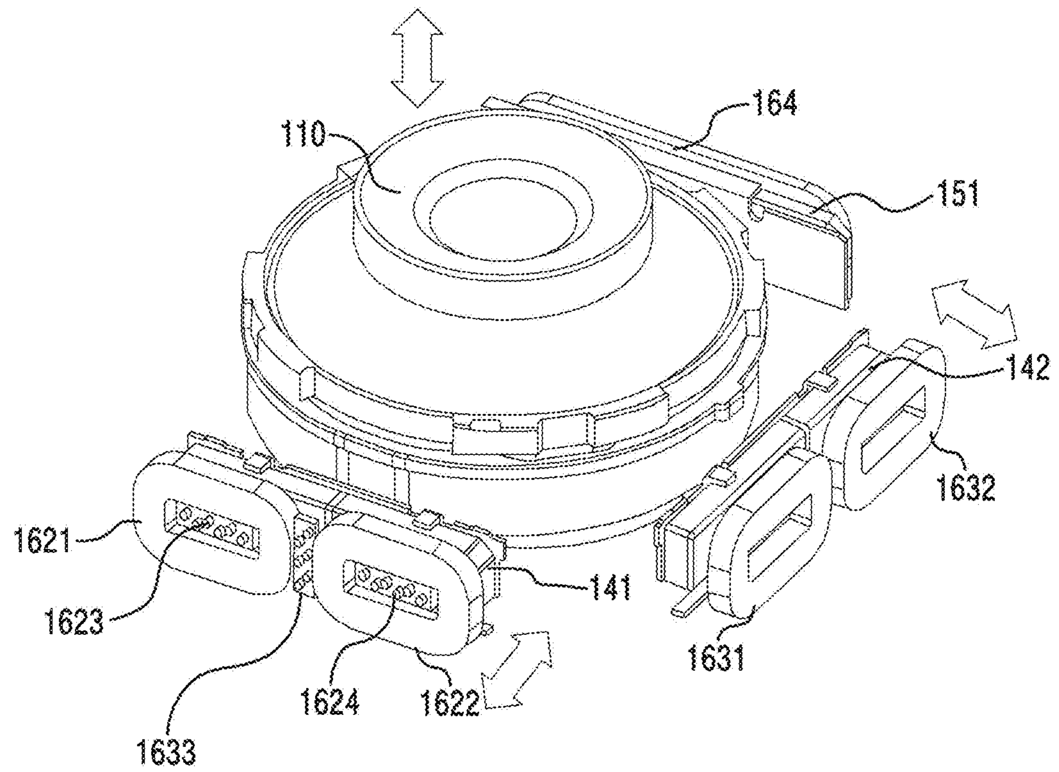

Referring to FIG. 8, in an embodiment, the AF drive coil 164 for the AF driving may be disposed on the third side of the housing 160 facing the first side in which the first axis drive coil 162 (e.g., the first drive coil 1621, the second drive coil 1622) for the OIS first axis driving is disposed and perpendicular to the second side in which the second axis drive coil 163 (e.g., the third drive coil 1631, the fourth drive coil 1632) for the OIS second axis rive driving is disposed. In this case, the AF magnet 151 fixed to the AF carrier 150 may be disposed to face the AF drive coil 164. The third position sensor (not shown) for the AF driving may be disposed on an inner or outer portion of the AF drive coil 164, to acquire information for measuring the position of the AF carrier 150 (or, the AF magnet 151).

Figure 9:
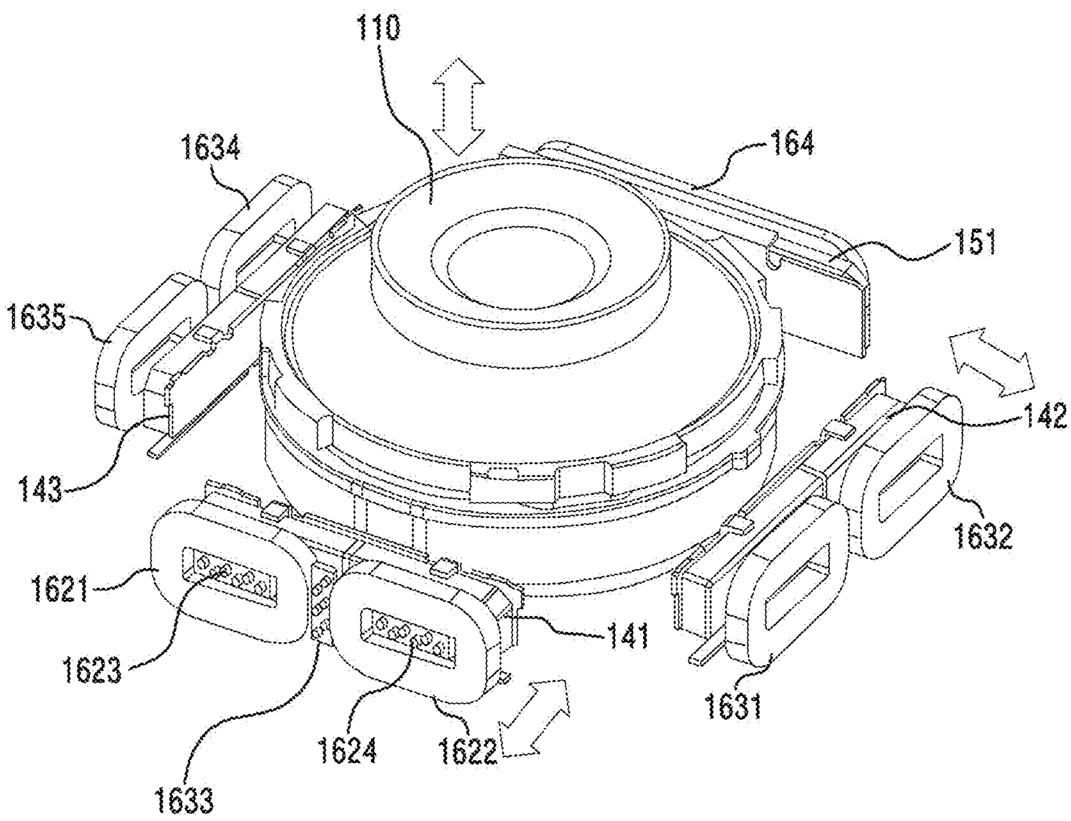

Referring to FIG. 9. in an embodiment, the second axis drive coil 163 (e.g., the third drive coil 1631, the fourth drive coil 1632, a fifth drive coil 1634, a sixth drive coil 1635) for the OIS second axis driving may be disposed on both sides perpendicular to the first side in which the first axis drive coil 162 (e.g., the first drive coil 1621, the second drive coil 1622) for the OIS first axis driving is disposed, that is, on the second side and the fourth side of the housing 160. In this case, two magnets (i.e., the second magnet 142 and another second magnet 143) facing the second axis drive coil 163 (e.g., the third drive coil 1631, the fourth drive coil 1632, the fifth drive coil 1634, the sixth drive coil 1635) may be disposed respectively, on the second side and the fourth side of the OIS carrier 140. For example, one second magnet 142 may be disposed on the second side of the OIS carrier 140 to face the third drive coil 1631 and the fourth drive coil 1632, and the other second magnet 143 may be disposed on the fourth side of the OIS carrier 140 to face the fifth drive coil 1634 and the sixth drive coil 1635. In the same manner as in FIG. 3, the second position sensor 1633 for the OIS second axis driving may be disposed to face the neutral zone of the first magnet 141 on the first side of the housing 160. The AF drive coil 164 for the AF driving may be disposed on the other side of the housing 160, that is, the third side facing the first side and perpendicular to the second side and the fourth side, and the AF magnet 151 may be disposed at a position facing the AF drive coil 164. The third position sensor (not shown) for the AF driving may be disposed, on the inner or outer portion of the AF drive coil 164.

Figure 10:
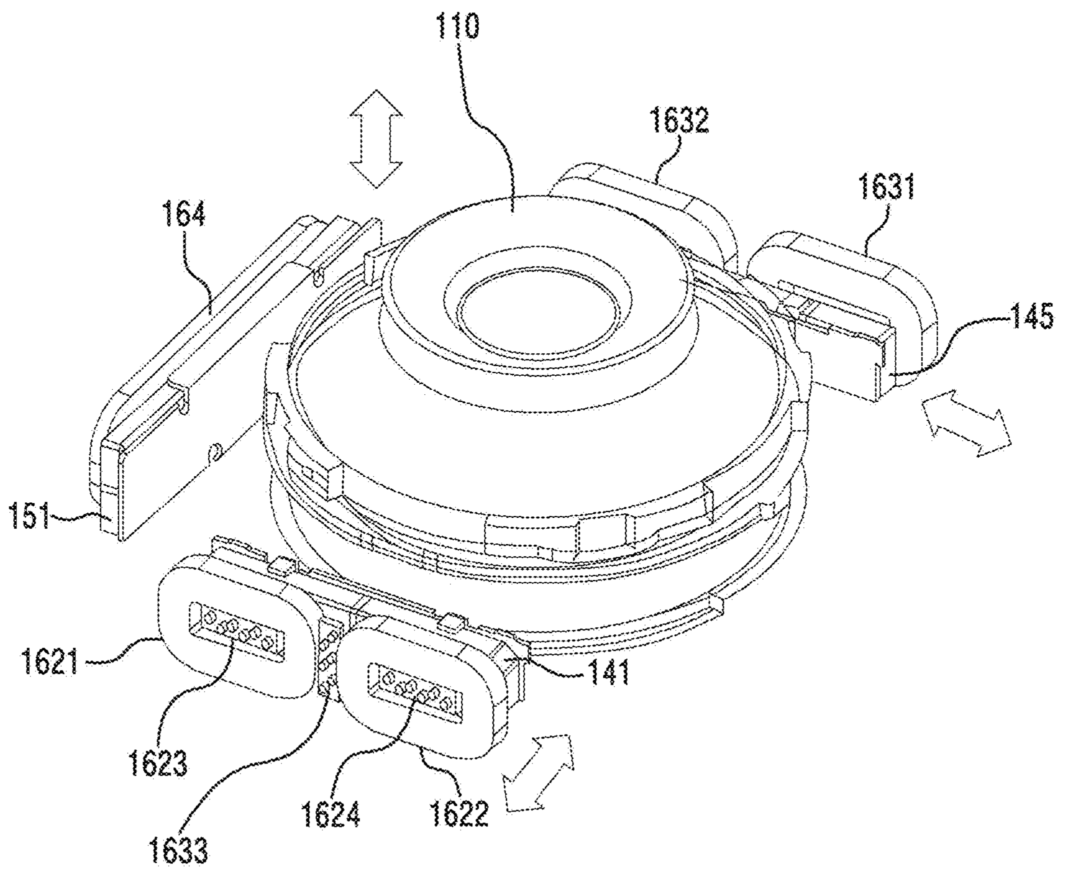

Referring to FIG. 10, in an embodiment, the second axis drive coil 163 (e.g., the third drive coil 1631, the fourth drive coil 1632) for the OIS second axis driving may be disposed on the third side facing the first side in which the first axis drive coil 162 (e.g., the first drive coil 1621, the second drive coil 1622) for the OIS first axis driving is disposed. In this case, the second magnet 145 fixed to the OIS carrier 140 may be disposed to face the second axis drive coil 163 (e.g., the third drive coil 1631, the fourth drive coil 1632). According to various embodiments, the second magnet 145 may be polarized to have three polarities (e.g., NSN or SNS) or four polarities (e.g., NSNS or SNSN). If the second magnet 145 is polarized into three poles (e.g., NSN), the pole disposed in the middle may be configured to be greater than the poles of both ends. In FIG. 10, at least a portion of the lens assembly 110 and the OIS carrier 140 may move in the direction substantially perpendicular to the optical axis or rotate about the optical axis by the electromagnetic force generating between the coil and the magnet. As in FIG. 3, the second position sensor 1633 for the OIS second axis driving may be disposed on the first side of the housing 160 to face the neutral zone of the first magnet 141. The AF drive coil 164 for the AF driving may be disposed on the fourth side perpendicular to both of the first side in which the first axis drive coil 162 is disposed and the fourth side in which the second axis drive coil 163 is disposed, and the AF magnet 151 may be disposed at a position facing the AF drive coil 164. The third position sensor (not shown) for the AF driving may be disposed, on the inner or outer portion of the AF drive coil 164.

According to various embodiments, even if the arrangement of the components for the OIS second axis driving or the components for the AF driving is modified as shown in FIGS. 7 through 10, the driving control on each axis may be performed by the driving control corresponding to the arrangement of FIG. 3.

Figure 11:
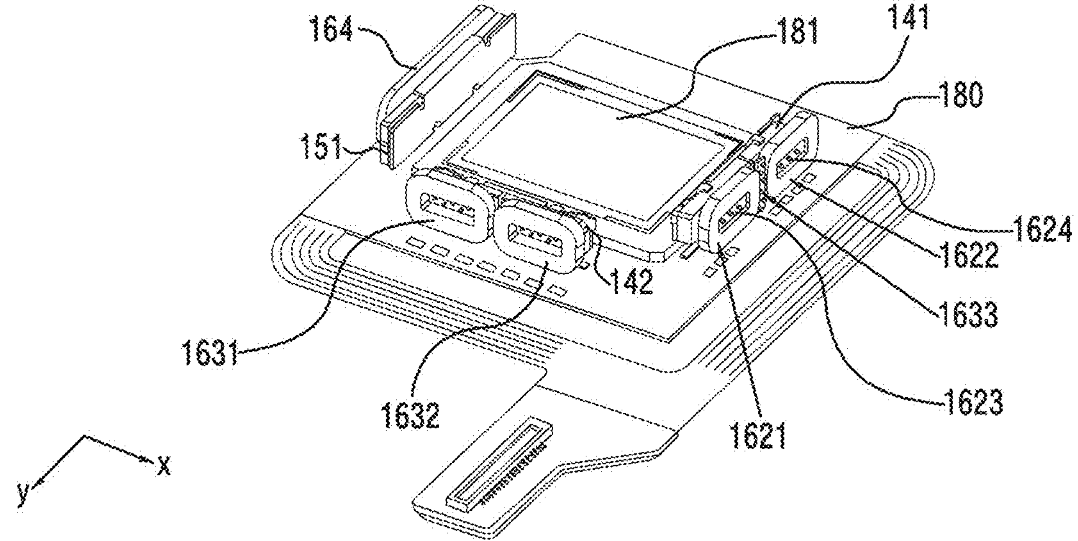
FIG. 11 is a diagram illustrating an arrangement of a sensor-shift OIS driving unit according to an embodiment of the disclosure.

FIG. 11 is a diagram illustrating an arrangement of a sensor-shift OIS driving unit according to an embodiment of the disclosure.

Figure 12:
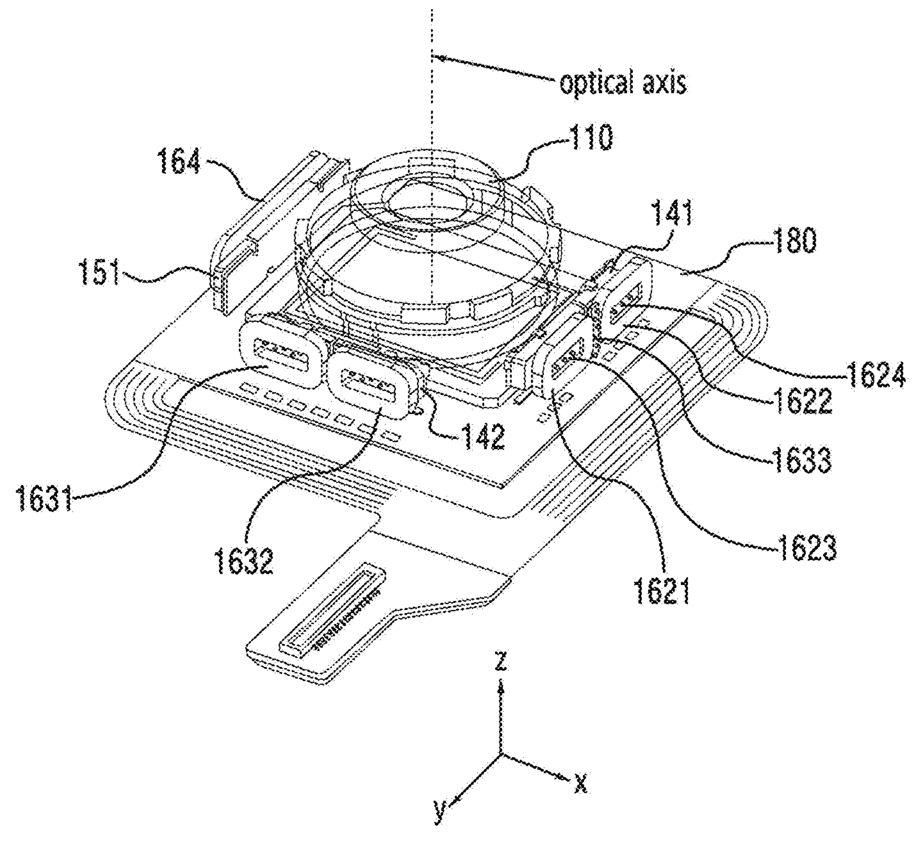
FIG. 12 is a perspective view illustrating an arrangement of a sensor-shift OIS driving unit applied to a direct-type camera module according to an embodiment of the disclosure.

FIG. 12 is a perspective view illustrating an arrangement of a sensor-shift OIS driving unit applied to a direct-type camera module according to an embodiment of the disclosure.

Figure 13:
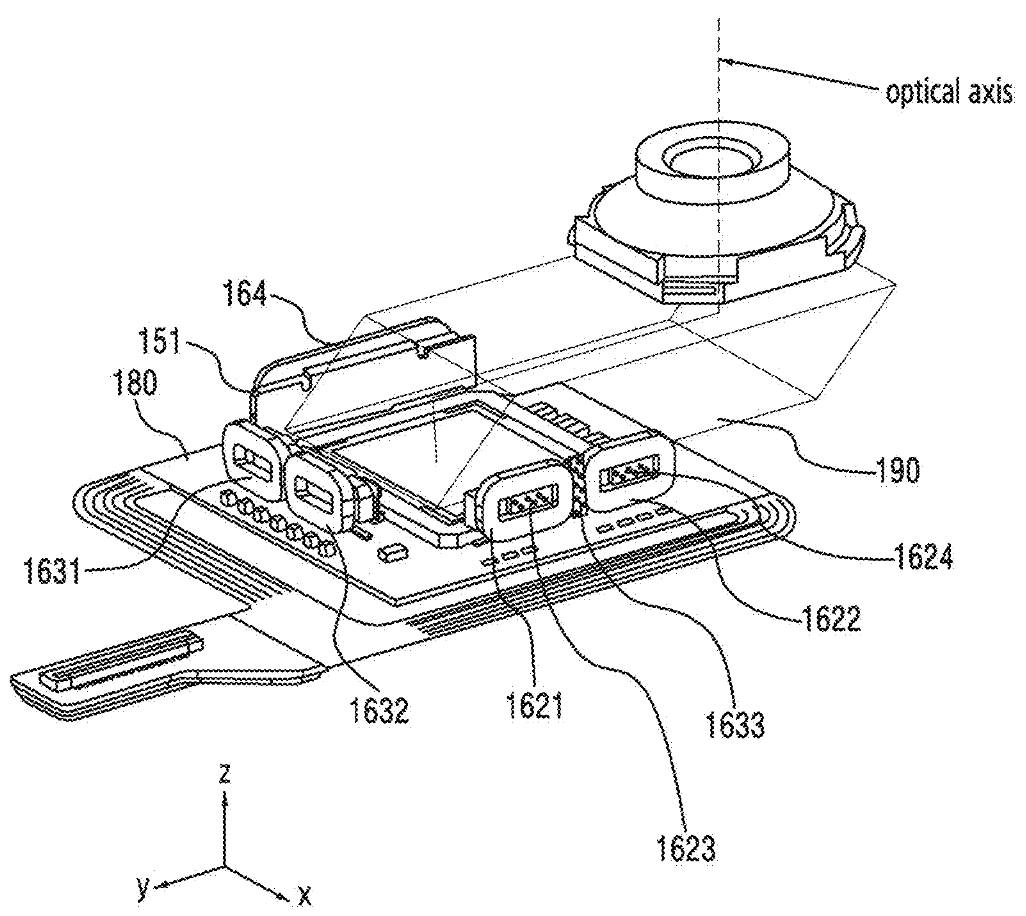
FIG. 13 is a perspective view illustrating an arrangement of a sensor-shift OIS driving unit applied to a folded-type camera module according to an embodiment of the disclosure.

FIG. 13 is a perspective view illustrating an arrangement of a sensor-shift OIS driving unit applied to a folded-type camera module according to an embodiment of the disclosure.

Referring to FIGS. 11 through 13, the camera module 100 may apply sensor-shift OIS which moves the image sensor 181 inside the camera module 100 to compensate for shaking in the photographing. The sensor-shift OIS is similar in the basic structure to the OIS driving unit explained in FIGS. 1 through 3, 4A, 4B, 5A, 5B, 6A, 6B, and 7 through 10, but is different in that the image sensor 181 in the camera module 100, rather than the lens assembly 110, is moved in the direction substantially perpendicular to the optical axis or rotated about the optical axis by the OIS carrier 140.

The sensor-shift OIS structure according to an embodiment may be disposed in the assembly as shown in FIG. 11. For example, if the first axis drive coil 162 (e.g., the first drive coil 1621, the second drive coil 1622) for the OIS first axis (e.g., OIS X axis) driving is disposed on the first side of the housing 160, the first magnet 141 used for the OIS first axis driving may be disposed to face the first axis drive coil 162 (e.g., the first drive coil 1621, the second drive coil 1622). According to various embodiments, the first axis drive coil 162 may be divided into two drive coils (e.g., the first drive coil 1621, the second drive coil 1622) to control the rotation driving about the optical axis, and accordingly the first magnet 141 may be configured to have two polarities. The first position sensor a 1623 and the first position sensor b 1624 for measuring the OIS first axis position of the first magnet 141 may be disposed, at the coil centers of the first drive coil 1621 and the second drive coil 1622 respectively. The second position sensor 1633 for measuring the OIS second axis position may be disposed on the first side of the housing 160 to face the neutral zone of the first magnet 141. The second axis drive coil 163 (e.g., the third drive coil 1631, the fourth drive coil 1632) for the OIS second axis (e.g., OIS Y axis) driving may be disposed on the fourth side of the housing 160 substantially perpendicular to the first side, and the second magnet 142 used for the OIS second axis driving may be disposed to face the second axis drive coil 163 (e.g., the third drive coil 1631, the fourth drive coil 1632). According to various embodiments, the second magnet 142 may be configured to have two polarities to reduce the magnitude of the leakage magnetic flux generating in the magnet, and accordingly the second axis drive coil 163 may be divided into two drive coils (e.g., the third drive coil 1631, the fourth drive coil 1632). The AF drive coil 164 for the AF driving may be disposed on the third side of the housing 160 facing the first side and perpendicular to the fourth side. In an embodiment, if the current is applied to the OIS first axis drive coil 162 (e.g., the first drive coil 1621, the second drive coil 1622) and/or the OIS second axis drive coil 163 (e.g., the third drive coil 1631, the fourth drive coil 1632), the image sensor 181 and the OIS carrier 140 including at least a portion of the image sensor 181 may move on a plane substantially perpendicular to the optical axis or rotate based on the optical axis by the electromagnetic interaction between the OIS first axis drive coil 162 and the first magnet 141 and/or the electromagnetic interaction between the OIS second axis drive coil 163 and the second magnet 142. Besides, the sensor-shift OIS structure may adopt arrangement modified in various forms as shown in FIGS. 7 through 10. According to various embodiments, the sensor-shift OIS structure as shown in FIG. 12 may be deployed if the camera module 100 is of the direct type which forms the optical path along the optical axis. According to various embodiments, the sensor-shift OIS structure as shown in FIG. 13 may be deployed if the camera module 100 is of the folded type which forms the optical path by bending the optical axis one or more times. In this case, an optical mirror 190 (e.g., a prism, a mirror) for refracting the path of the light may be additionally mounted in the basic structure of the camera module 100.

Figure 14A:
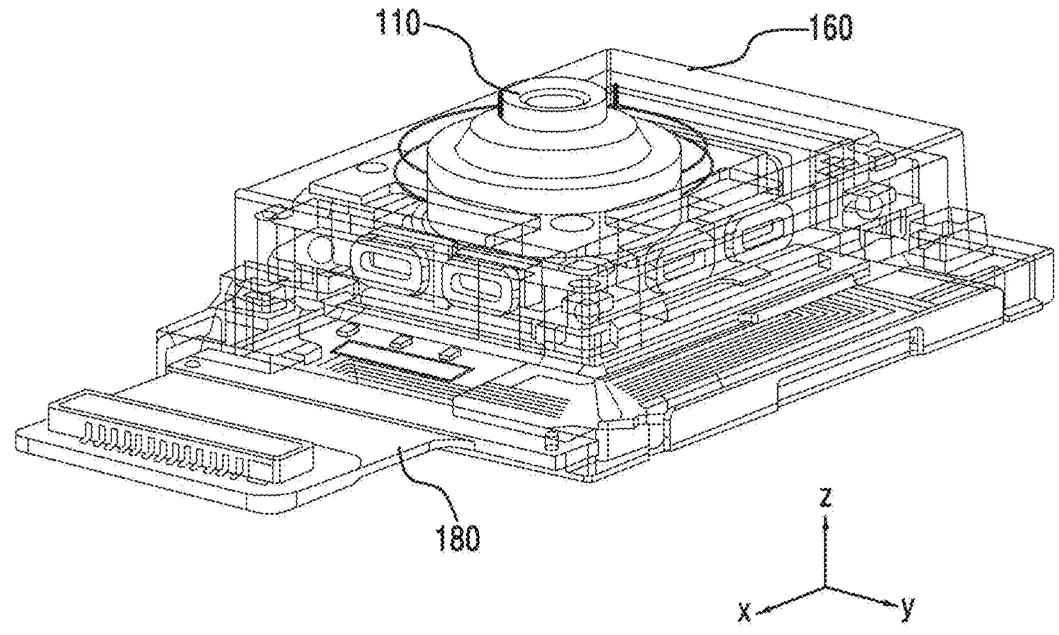
FIG. 14A is a perspective view illustrating an exterior of a direct-type camera module according to an embodiment of the disclosure.

FIG. 14A is a perspective view illustrating an exterior of a direct-type camera module according to an embodiment of the disclosure.

Figure 14B:
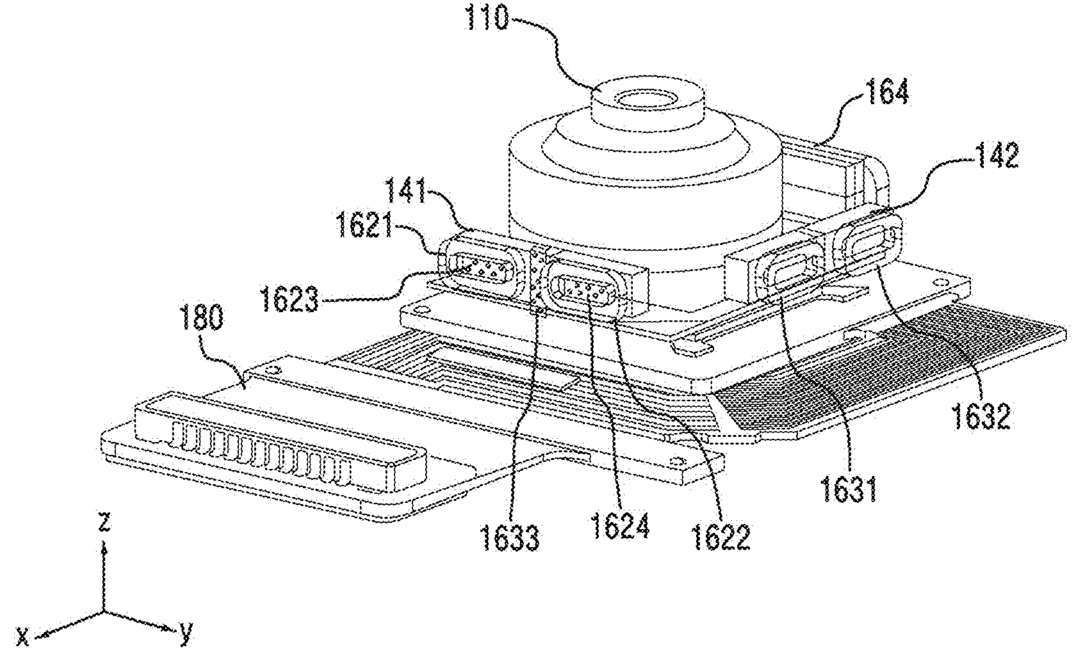
FIG. 14B is a perspective view illustrating a lens assembly and a sensor-shift OIS driving unit of a direct-type camera module according to an embodiment of the disclosure.

FIG. 14B is a perspective view illustrating a lens assembly and a sensor-shift OIS driving unit of the direct-type camera module according to an embodiment of the disclosure.

Figure 14C:
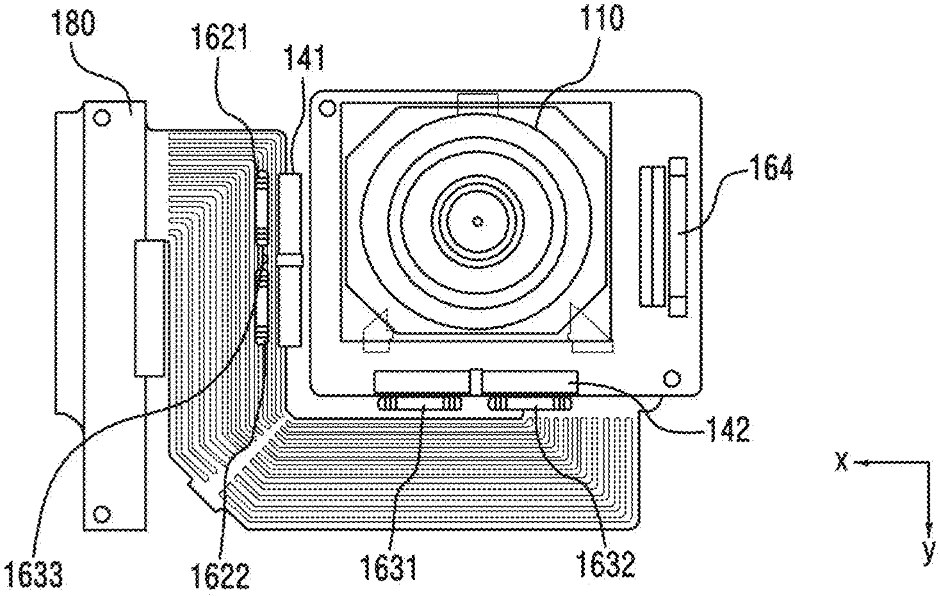
FIG. 14C is a plan view illustrating a lens assembly and a sensor-shift OIS driving unit of a direct-type camera module according to an embodiment of the disclosure.

FIG. 14C is a plan view illustrating the lens assembly and the sensor-shift OIS driving unit of the direct-type camera module according to an embodiment of the disclosure.

Referring to FIGS. 14A through 14C, the direct-type camera module may be similar to the camera module 100 shown in FIG. 1 in the external appearance. In the direct-type camera module, the shied can 120 is configured to cover the camera module 100 from the top to the bottom as a whole, and at least a portion of the lens assembly 110 may be exposed to the outside through the opening of the designated size formed at the center portion of the upper face of the shield can 120. The components of the camera module 100 is disposed inside the shield can 120, and the components for the sensor-shift OIS driving may be disposed in the assembly as shown in FIGS. 14B and 14C.

In an embodiment, the first axis drive coil 162 (e.g., the first drive coil 1621 and the second drive coil 1622) for the OIS first axis driving may be disposed on the first side of the housing 160, and the first magnet 141 may be disposed at a position facing the first drive coil 1621 and the second drive coil 1622 in the sides of the OIS carrier 140. The first position sensor a 1623 may be disposed at the coil center of the first drive coil 1621, and the first position sensor b 1624 may be disposed at the coil center of the second drive coil 1622. The first position sensor a 1623 and the first position sensor b 1624 may measure the OIS first axis direction position of the first magnet 141 at their position, and perform the feedback control by applying a current to the first drive coil 1621 and the second drive coil 1622 to move at least a portion of the image sensor 181 disposed on the printed circuit board 180 in response to the measured position.

In an embodiment, the second axis drive coil 163 (e.g., the third drive coil 1631 and the fourth drive coil 1632) for the OIS second axis driving may be disposed on the second side of the housing 160 substantially perpendicular to the first side, and the second magnet 142 may be disposed at a position facing the third drive coil 1631 and the fourth drive coil 1632 in the sides of the OIS carrier 140. The second position sensor 1633 associated with the OIS second axis driving may be disposed on the first side of the housing 160 to face the neutral zone where the different polarities are offset in the first magnet 141, to reduce the crosstalk in the other axis driving. The detailed configuration of the second position sensor 1633 may employ the description of FIG. 4B in the same manner. The second position sensor 1633 may measure the OIS second axis direction position, and perform the feedback control by applying a current to the third drive coil 1631 and/or the fourth drive coil 1632 to move at least a portion of the image sensor 181 disposed on the printed circuit board 180 in response to the measured position.

In an embodiment, the AF drive coil 164 for the AF driving may be disposed on the third side of the housing 160 facing the first side and perpendicular to the second side, and an AF magnet (not shown) may be disposed at a position facing the AF drive coil 164 in the sides of the AF carrier 150. A third position sensor (not shown) for measuring the position of the AF carrier 150 (or, the AF magnet 151), and controlling the AF driving may be disposed, on an inner side or an outer side of the AF drive coil 164.

Figure 15A:
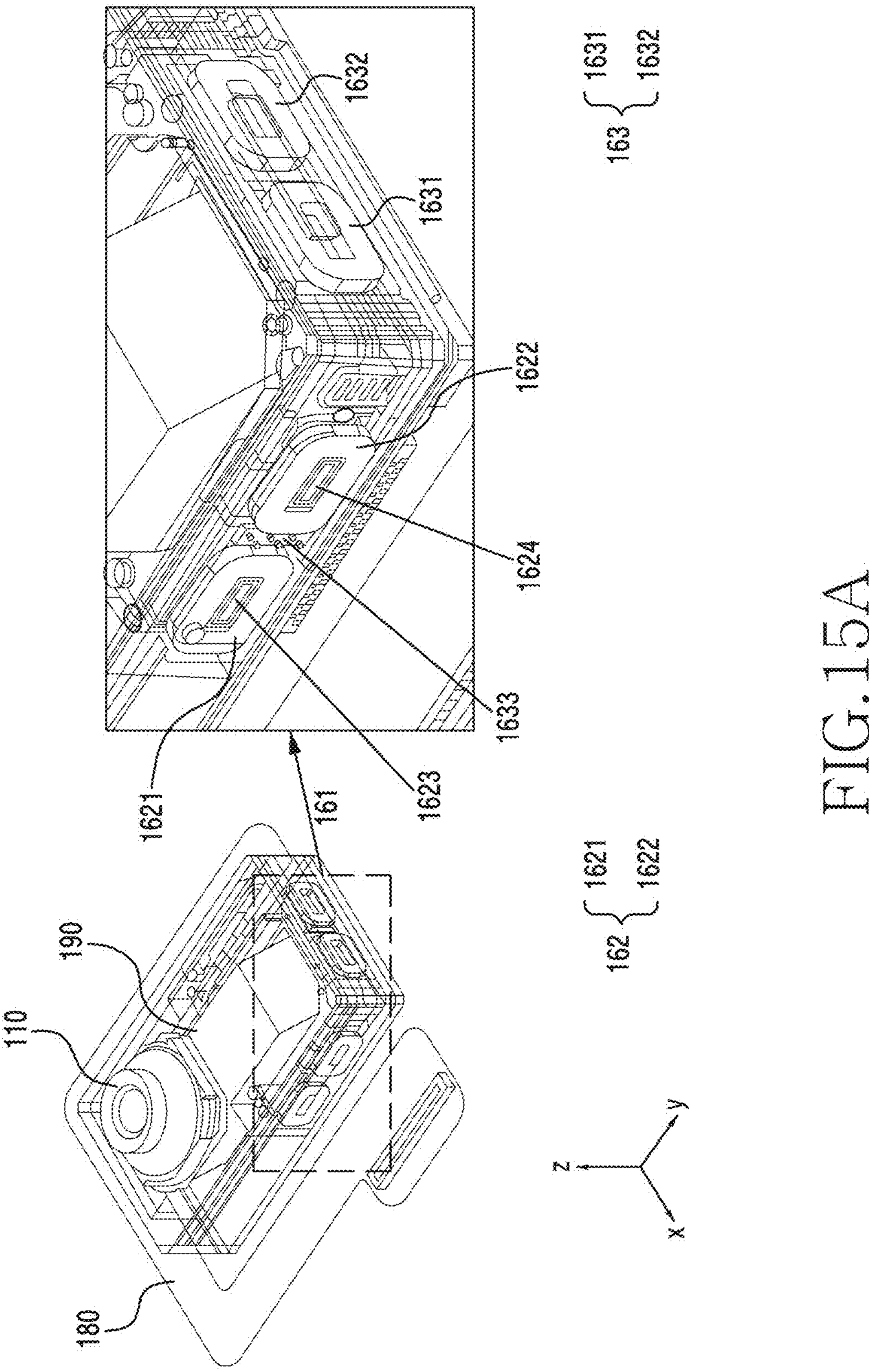
FIG. 15A is a perspective view illustrating a lens assembly and a sensor-shift OIS driving unit of a folded-type camera module according to an embodiment of the disclosure.

FIG. 15A is a perspective view illustrating a lens assembly and a sensor-shift OIS driving unit of a folded-type camera module according to an embodiment of the disclosure.

Figure 15B:
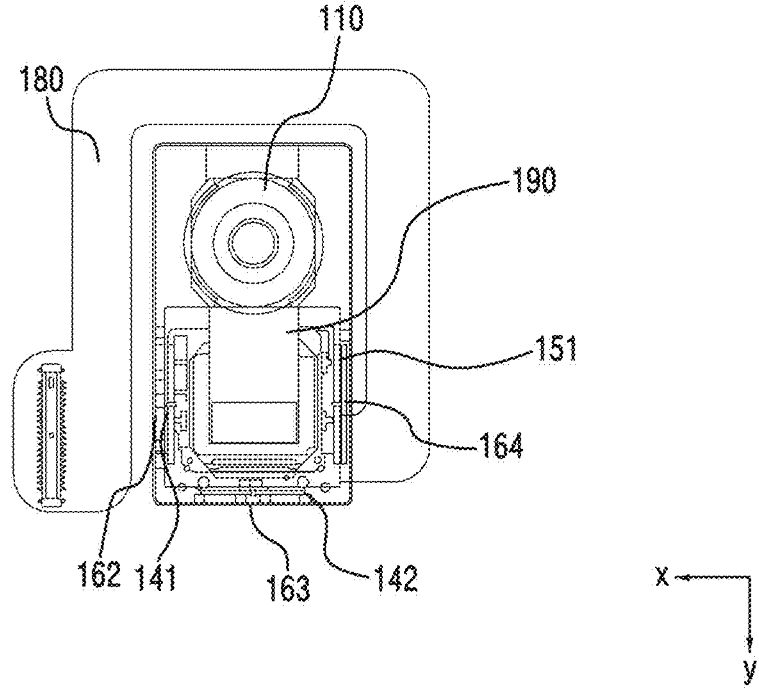
FIG. 15B is a plan view illustrating a lens assembly and a sensor-shift OIS driving unit of a folded-type camera module according to an embodiment of the disclosure.

FIG. 15B is a perspective view illustrating the lens assembly and the sensor-shift OIS driving unit of the folded-type camera module according to an embodiment of the disclosure.

Referring to FIGS. 15A and 15B, the folded-type camera module is similar in the basic structure to the direct-type camera module described in FIGS. 14A to 14C, but may further include the optical mirror 190 which refracts the incident light through the lens assembly 110 and transmits it to the image sensor 181 disposed on the printed circuit board 180. The optical mirror 190 may include materials that refract and/or reflect the incident light, such as a prism or a mirror. For example, the incident light through the lens assembly 110 may be refracted in the optical axis one or more times through the optical mirror 190 and transmitted to the image sensor 181. Unlike the direct-type camera module which arranges the lens assembly 110 and the image sensor 181 vertically based on the optical axis, the folded-type camera module may horizontally arrange the lens assembly 110 and the image sensor 181 and thus reduce thickness of the camera module and implement high-magnification optical zoom.

In an embodiment, the components for the sensor-shift OIS driving may be arranged in the assembly as shown in FIGS. 15A and 15B. The first axis drive coil 162 for the OIS first axis driving may be disposed on the first side of the housing 160, and the second axis drive coil 163 for the OIS second axis driving may be disposed on the second side of the housing 160. The first axis drive coil 162 may include two drive coils (e.g., the first drive coil 1621 and the second drive coil 1622), and the first position sensor a 1623 and the first position sensor b 1624 may be disposed at the coil centers of the drive coils 1621 and 1622 respectively. The first magnet 141 may be disposed at a position facing the first drive coil 1621 and the second drive coil 1622. Accordingly, the first position sensor a 1623 and the first position sensor b 1624 may measure the OIS first axis direction position of the first magnet 141 at their position, and perform the feedback control by applying a current to the first drive coil 1621 and the second drive coil 1622 to move at least a portion of the image sensor 181 disposed on the printed circuit board 180 in response to the measured position.

In an embodiment, the second position sensor 1633 associated with the OIS second axis driving may be disposed on the first side of the housing 160 to face the neutral zone of the first magnet 141, to reduce the crosstalk in the other axis driving. The detailed configuration of the second position sensor 1633 may employ the description of FIG. 4B in the same manner. The second position sensor 1633 may measure the OIS second axis direction position, and perform the feedback control by applying a current to the second axis drive coil 163 to move at least a portion of the image sensor 181 disposed on the printed circuit board 180 in response to the measured position.

In an embodiment, the AF drive coil 164 for the AF driving may be disposed on the third side of the housing 160 facing the first side and perpendicular to the second side, and the AF magnet 151 may be disposed at a position facing the AF drive coil 164 in the sides of the AF carrier 150. A third position sensor (not shown) for measuring the position of the AF carrier 150 (or, the AF magnet 151), and controlling the AF driving may be disposed, on an inner side or an outer side of the AF drive coil 164.

Figure 16A:
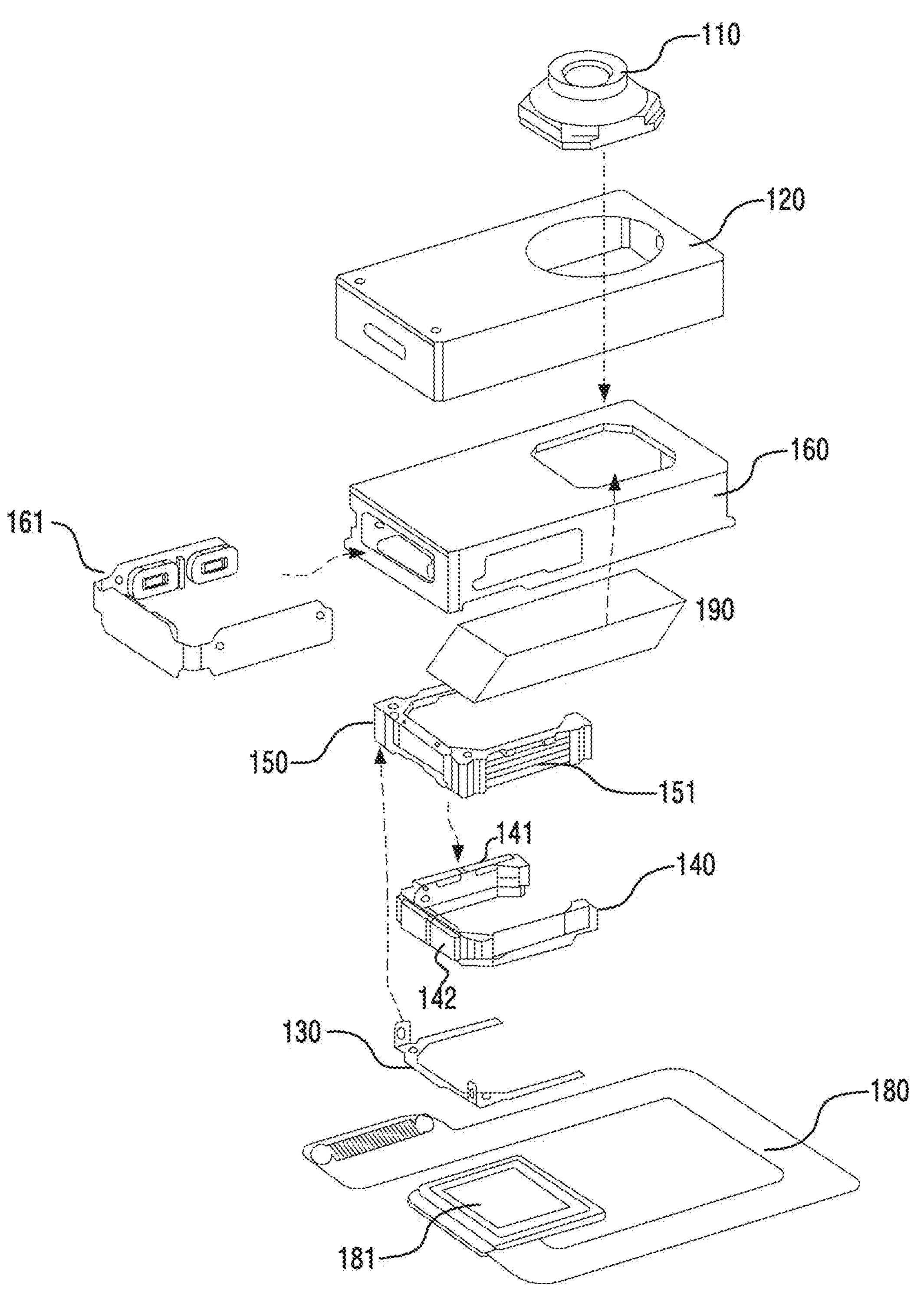
FIG. 16A is an exploded perspective view of a folded-type camera module according to an embodiment of the disclosure.

FIG. 16A is an exploded perspective view of a folded-type camera module according to an embodiment of the disclosure.

Figure 16B:
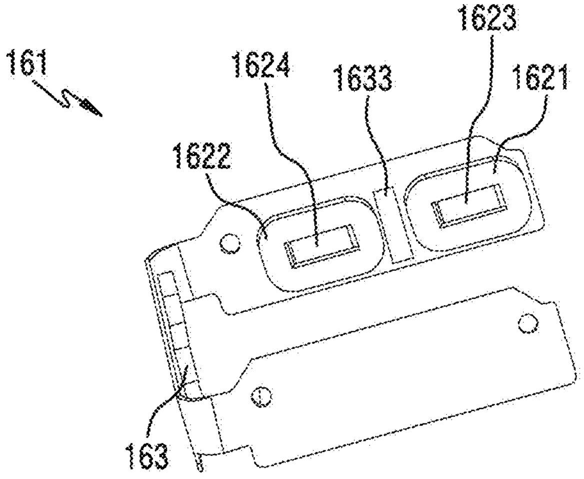
FIG. 16B is a diagram illustrating a printed circuit board assembly included in a folded-type camera module according to an embodiment of the disclosure.

FIG. 16B is a diagram illustrating a printed circuit board assembly included in the folded-type camera module according to an embodiment of the disclosure.

Figure 16C:
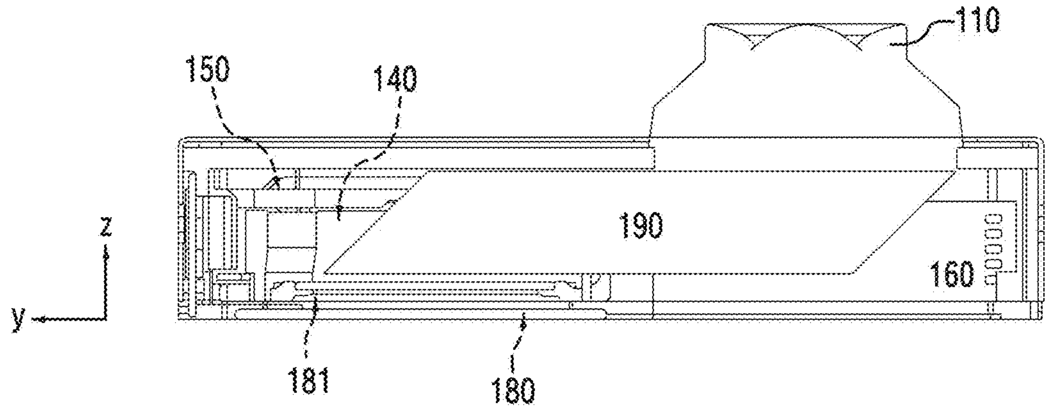
FIG. 16C is a cross-sectional view of a folded-type camera module cut in a width direction according to an embodiment of the disclosure.

FIG. 16C is a cross-sectional view of the folded-type camera module cut in a width direction according to an embodiment of the disclosure.

Referring to FIGS. 16A through 16C, the folded-type camera module may include the lens assembly 110, the shield can 120, the housing 160, the optical mirror 190, the AF carrier 150, the OIS carrier 140, the stopper 130, the printed circuit board 180, and/or the image sensor 181. However, the configuration of the camera module 100 is not limited thereto, and at least one of the components may be omitted or one or more other components may be added.

In an embodiment, the lens assembly 110 may include one or more lenses for projecting an image of a subject onto the image sensor 181 using the incident light from the outside.

In an embodiment, the shield can 120 may be configured to cover the camera module 100 from top to bottom as a whole. For example, the shield can 120 may include an upper face, and sides disposed perpendicularly to edges of the upper face, and a lower face may be opened. An opening in a designated size may be formed to expose a part of the lens assembly 110 to the outside, in a center portion of the upper face of the shield can 120. According to various embodiments, the shield can 120 may be formed with a metal material or a material (e.g., reinforced plastic) having hardness over a designated level to protect other components (e.g., the housing 160, the optical mirror 190, the AF carrier 150, the OIS carrier 140, the stopper 130, the printed circuit board 180 and/or the image sensor 181) of the camera module 100.

In an embodiment, the housing 160 may be configured to accommodate at least a portion of the lens assembly 110, the optical mirror 190, the AF carrier 150, the OIS carrier 140 and/or the stopper 130. The housing 160 is opened in an upper face and a lower face, and may include one or more sides disposed to surround the above components (e.g., at least a portion of the lens assembly 110, the optical mirror 190, the AF carrier 150, the OIS carrier 140 and/or the stopper 130). For example, the housing 160 may include a first side, a third side facing the first side, a second side perpendicular to the first side and the third side, and a fourth side facing the second side. In an embodiment, the housing 160 may be coupled with the printed circuit board assembly 161 formed to surround at least a part of the sides of the housing 160. The printed circuit board assembly 161 may include an FPCB.

In an embodiment, the printed circuit board assembly 161 may include a first side, a second side substantially perpendicular to the first side, and a third side facing the first side and substantially perpendicular to the second side. For example, the first axis drive coil 162 (e.g., the first drive coil 1621, the second drive coil 1622) for the OIS first axis driving may be disposed on the first side of the printed circuit board assembly 161, and the second axis drive coil 163 for the OIS second axis driving may be disposed on the second side of the printed circuit board assembly 161. According to various embodiments, an AF drive coil (not shown) for the AF driving may be disposed on the other side (e.g., the third side) of the printed circuit board assembly 161. On the first side of the printed circuit board assembly 161, the first position sensor a 1623 and the first position sensor b 1624 for controlling the OIS first axis driving may be disposed at the coil center of the first drive coil 1621 and the second drive coil 1622 respectively, and the second position sensor 1633 may be disposed between the two drive coils 1621 and 1622. Herein, the first position sensor a 1623, the first position sensor b 1624 and the second position sensor 1633 may be hall sensors.

In an embodiment, the optical mirror 190 may refract the incident light through the lens assembly 110 and transmit it to the image sensor 181 disposed on the printed circuit board 180. For example, the refraction angle of the optical axis through the optical mirror 190 may be about 90 degrees. The optical mirror 190 may include materials that refract and/or reflect the incident light, such as a prism or a mirror.

In an embodiment, the AF carrier 150 may move the lens assembly 110 for the AF control in the optical axis direction. The AF magnet 151 for the AF driving may be fixed on one side of the sides forming the AF carrier 150. The AF magnet 151 may be disposed at a position facing an AF drive coil (not shown) to generate electromagnetic force through interaction with the AF drive coil (not shown) while the camera module 100 is assembled.

In an embodiment, the OIS carrier 140 may be disposed to accommodate at least a portion of the image sensor 181. Among sides forming the OIS carrier 140, the first magnet 141 for the OIS first driving may be fixed on one side, and the second magnet 142 for the OIS second driving may be fixed on the other side. The first magnet 141 and the second magnet 142 may be disposed at positions facing the first axis drive coils (e.g., the first drive coil 1621 and the second drive coil 1622) and the second axis drive coil 163 to generate electromagnetic force through interaction with the first axis drive coils (e.g., the first drive coil 1621 and the second drive coil 1622) and the second axis drive coil 163 while the camera module 100 is assembled. In so doing, the first magnet 141 may be disposed to face the second position sensor 1633 with the neutral zone of the first magnet 141.

In an embodiment, the stopper 130 may be disposed between the OIS carrier 140 and the image sensor 181, to prevent the OIS carrier 140 from deviating in one direction (e.g., the optical axis direction or the upward direction).

In an embodiment, the image sensor 181 may move in a direction substantially perpendicular to the optical axis or rotate about the optical axis by the electromagnetic force generating between the AF drive (not shown) and the AF magnet 151.

In an embodiment, the image sensor 181 may be disposed on an upper face of the printed circuit board 180 (e.g., a PCB, a PBA, an FPCB, or a RFPCB) of the camera module 100. The image sensor 181 may be electrically connected to an image signal processor connected to the printed circuit board 180 by a connector. The connector may use an FPCB, a cable, or the like. According to various embodiments, the image sensor 181 may be a CMOS sensor or a CCD sensor. A plurality of individual pixels may be integrated in the image sensor 181, and each individual pixel may include a micro lens, a color filter, and a photodiode. Each individual pixel is a kind of a photodetector and may convert the incident light into an electrical signal. The photodetector may include a photodiode.

In an embodiment, if the folded-type camera module is assembled, the lens assembly 110 and the image sensor 181 may be disposed in parallel, and the optical signal of the subject incident through the lens assembly 110 may be refracted one or more times by the optical mirror 190 and transmitted to the image sensor 181 as shown in FIG. 16C. According to various embodiments, the optical mirror 190 included in the folded-type camera module may include two triangular prisms 190-1 and 190-2, as shown in FIG. 16D.

Figure 16D:
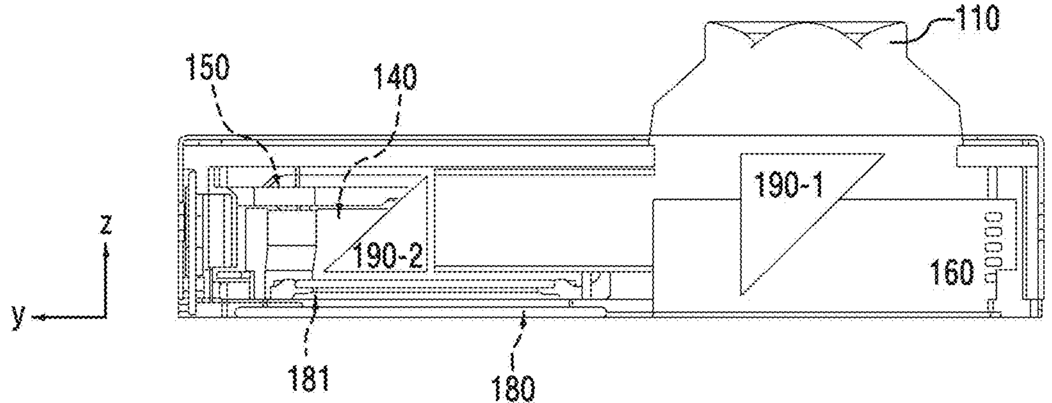
FIG. 16D is a cross-sectional view of a folded-type camera module cut in a width direction according to an embodiment of the disclosure.

FIG. 16D is a cross-sectional view of a folded-type camera module cut in a width direction according to an embodiment of the disclosure.

Referring to FIG. 16D, the optical signal of the subject incident through the lens assembly 110 may be refracted about 90 degrees by the first prism 190-1 and transmitted to the second prism 190-2, and then refracted about 90 degrees by the second prism 190-2 and transmitted to the image sensor 181. According to various embodiments, a lens module may be additionally disposed between the two triangular prisms 190-1 and 190-2. In this case, the optical signal of the subject incident through the lens assembly 110 may be refracted by the first prism 190-1, changed in magnification and/or brightness through the lens module, and refracted by the second prism 190-2 and transmitted to the image sensor 181.

FIG. 17 is a block diagram illustrating an electronic device 701 in a network environment 700 according to an embodiment of the disclosure.

Referring to FIG. 17, the electronic device 701 in the network environment 700 may communicate with an electronic device 702 via a first network 798 (e.g., a short-range wireless communication network), or an electronic device 704 or a server 708 via a second network 799 (e.g., a long-range wireless communication network). According to an embodiment, the electronic device 701 may communicate with the electronic device 704 via the server 708. According to an embodiment, the electronic device 701 may include a processor 720, memory 730, an input module 750, a sound output module 755, a display module 760, an audio module 770, a sensor module 776, an interface 777, a connecting terminal 778, a haptic module 779, a camera module 780, a power management module 788, a battery 789, a communication module 790, a subscriber identification module (SIM) 796, or an antenna module 797. In some embodiments, at least one of the components (e.g., the connecting terminal 778) may be omitted from the electronic device 701, or one or more other components may be added in the electronic device 701. In some embodiments, some of the components (e.g., the sensor module 776, the camera module 780, or the antenna module 797) may be implemented as a single component (e.g., the display module 760).

The processor 720 may execute, for example, software (e.g., a program 740) to control at least one other component (e.g., a hardware or software component) of the electronic device 701 coupled with the processor 720, and may perform various data processing or computation. According to one embodiment, as at least part of the data processing or computation, the processor 720 may store a command or data received from another component (e.g., the sensor module 776 or the communication module 790) in volatile memory 732, process the command or the data stored in the volatile memory 732, and store resulting data in non-volatile memory 734. According to an embodiment, the processor 720 may include a main processor 721 (e.g., a central processing unit (CPU) or an application processor (AP)), or an auxiliary processor 723 (e.g., a graphics processing unit (GPU), a neural processing unit (NPU), an image signal processor (ISP), a sensor hub processor, or a communication processor (CP)) that is operable independently from, or in conjunction with, the main processor 721. For example, when the electronic device 701 includes the main processor 721 and the auxiliary processor 723, the auxiliary processor 723 may be adapted to consume less power than the main processor 721, or to be specific to a specified function. The auxiliary processor 723 may be implemented as separate from, or as part of the main processor 721.

The auxiliary processor 723 may control at least some of functions or states related to at least one component (e.g., the display module 760, the sensor module 776, or the communication module 790) among the components of the electronic device 701, instead of the main processor 721 while the main processor 721 is in an inactive (e.g., sleep) state, or together with the main processor 721 while the main processor 721 is in an active state (e.g., executing an application). According to an embodiment, the auxiliary processor 723 (e.g., an image signal processor or a communication processor) may be implemented as part of another component (e.g., the camera module 780 or the communication module 790) functionally related to the auxiliary processor 723. According to an embodiment, the auxiliary processor 723 (e.g., the neural processing unit) may include a hardware structure specified for artificial intelligence model processing. An artificial intelligence model may be generated by machine learning. Such learning may be performed, e.g., by the electronic device 701 where the artificial intelligence is performed or via a separate server (e.g., the server 708). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 730 may store various data used by at least one component (e.g., the processor 720 or the sensor module 776) of the electronic device 701. The various data may include, for example, software (e.g., the program 740) and input data or output data for a command related thereto. The memory 730 may include the volatile memory 732 or the non-volatile memory 734.

The program 740 may be stored in the memory 730 as software, and may include, for example, an operating system (OS) 742, middleware 744, or an application 746.

The input module 750 may receive a command or data to be used by another component (e.g., the processor 720) of the electronic device 701, from the outside (e.g., a user) of the electronic device 701. The input module 750 may include, for example, a microphone, a mouse, a keyboard, a key (e.g., a button), or a digital pen (e.g., a stylus pen).

The sound output module 755 may output sound signals to the outside of the electronic device 701. The sound output module 755 may include, for example, a speaker or a receiver. The speaker may be used for general purposes, such as playing multimedia or playing record. The receiver may be used for receiving calls. According to an embodiment, the receiver may be implemented as separate from, or as part of the speaker.

The display module 760 may visually provide information to the outside (e.g., a user) of the electronic device 701. The display module 760 may include, for example, a display, a hologram device, or a projector and control circuitry to control a corresponding one of the display, hologram device, and projector. According to an embodiment, the display module 760 may include a touch sensor adapted to detect a touch, or a pressure sensor adapted to measure the intensity of force incurred by the touch.

The audio module 770 may convert a sound into an electrical signal and vice versa. According to an embodiment, the audio module 770 may obtain the sound via the input module 750, or output the sound via the sound output module 755 or a headphone of an external electronic device (e.g., an electronic device 702) directly (e.g., wiredly) or wirelessly coupled with the electronic device 701.

The sensor module 776 may detect an operational state (e.g., power or temperature) of the electronic device 701 or an environmental state (e.g., a state of a user) external to the electronic device 701, and then generate an electrical signal or data value corresponding to the detected state. According to an embodiment, the sensor module 776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 777 may support one or more specified protocols to be used for the electronic device 701 to be coupled with the external electronic device (e.g., the electronic device 702) directly (e.g., wiredly) or wirelessly. According to an embodiment, the interface 777 may include, for example, a high definition multimedia interface (HDMI), a universal serial bus (USB) interface, a secure digital (SD) card interface, or an audio interface.

A connecting terminal 778 may include a connector via which the electronic device 701 may be physically connected with the external electronic device (e.g., the electronic device 702). According to an embodiment, the connecting terminal 778 may include, for example, a HDMI connector, a USB connector, a SD card connector, or an audio connector (e.g., a headphone connector).

The haptic module 779 may convert an electrical signal into a mechanical stimulus (e.g., a vibration or a movement) or electrical stimulus which may be recognized by a user via his tactile sensation or kinesthetic sensation. According to an embodiment, the haptic module 779 may include, for example, a motor, a piezoelectric element, or an electric stimulator.

The camera module 780 may capture a still image or moving images. According to an embodiment, the camera module 780 may include one or more lenses, image sensors, image signal processors, or flashes.

The power management module 788 may manage power supplied to the electronic device 701. According to one embodiment, the power management module 788 may be implemented as at least part of, for example, a power management integrated circuit (PMIC).

The battery 789 may supply power to at least one component of the electronic device 701. According to an embodiment, the battery 789 may include, for example, a primary cell which is not rechargeable, a secondary cell which is rechargeable, or a fuel cell.

The communication module 790 may support establishing a direct (e.g., wired) communication channel or a wireless communication channel between the electronic device 701 and the external electronic device (e.g., the electronic device 702, the electronic device 704, or the server 708) and performing communication via the established communication channel. The communication module 790 may include one or more communication processors that are operable independently from the processor 720 (e.g., the application processor (AP)) and supports a direct (e.g., wired) communication or a wireless communication. According to an embodiment, the communication module 790 may include a wireless communication module 792 (e.g., a cellular communication module, a short-range wireless communication module, or a global navigation satellite system (GNSS) communication module) or a wired communication module 794 (e.g., a local area network (LAN) communication module or a power line communication (PLC) module). A corresponding one of these communication modules may communicate with the external electronic device via the first network 798 (e.g., a short-range communication network, such as Bluetooth™, wireless-fidelity (Wi-Fi) direct, or infrared data association (IrDA)) or the second network 799 (e.g., a long-range communication network, such as a legacy cellular network, a fifth-generation (5G) network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 792 may identify and authenticate the electronic device 701 in a communication network, such as the first network 798 or the second network 799, using subscriber information (e.g., international mobile subscriber identity (IMSI)) stored in the subscriber identification module 796.

The wireless communication module 792 may support a 5G network, after a fourth-generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 792 may support a high-frequency band (e.g., the mm Wave band) to achieve, e.g., a high data transmission rate. The wireless communication module 792 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 792 may support various requirements specified in the electronic device 701, an external electronic device (e.g., the electronic device 704), or a network system (e.g., the second network 799). According to an embodiment, the wireless communication module 792 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 797 may transmit or receive a signal or power to or from the outside (e.g., the external electronic device) of the electronic device 701. According to an embodiment, the antenna module 797 may include an antenna including a radiating element composed of a conductive material or a conductive pattern formed in or on a substrate (e.g., a printed circuit board (PCB)). According to an embodiment, the antenna module 797 may include a plurality of antennas (e.g., array antennas). In such a case, at least one antenna appropriate for a communication scheme used in the communication network, such as the first network 798 or the second network 799, may be selected, for example, by the communication module 790 (e.g., the wireless communication module 792) from the plurality of antennas. The signal or the power may then be transmitted or received between the communication module 790 and the external electronic device via the selected at least one antenna. According to an embodiment, another component (e.g., a radio frequency integrated circuit (RFIC)) other than the radiating element may be additionally formed as part of the antenna module 797.

According to various embodiments, the antenna module 797 may form a mm Wave antenna module. According to an embodiment, the mm Wave antenna module may include a printed circuit board, a RFIC disposed on a first surface (e.g., the bottom surface) of the printed circuit board, or adjacent to the first surface and capable of supporting a designated high-frequency band (e.g., the mm Wave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 701 and the external electronic device 704 via the server 708 coupled with the second network 799. Each of the electronic devices 702 or 704 may be a device of a same type as, or a different type, from the electronic device 701. According to an embodiment, all or some of operations to be executed at the electronic device 701 may be executed at one or more of the external electronic devices 702, 704, or 708. For example, if the electronic device 701 should perform a function or a service automatically, or in response to a request from a user or another device, the electronic device 701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 701. The electronic device 701 may provide the outcome, with or without further processing of the outcome, as at least part of a reply to the request. To that end, a cloud computing, distributed computing, mobile edge computing (MEC), or client-server computing technology may be used, for example. The electronic device 701 may provide ultra low-latency services using, e.g., distributed computing or mobile edge computing. In another embodiment, the external electronic device 704 may include an internet-of-things (IoT) device. The server 708 may be an intelligent server using machine learning and/or a neural network. According to an embodiment, the external electronic device 704 or the server 708 may be included in the second network 799. The electronic device 701 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C,” may include any one of, or all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” “coupled to.” “connected with,” or “connected to” another element (e.g., a second element), it means that the element may be coupled with the other element directly (e.g., wiredly), wirelessly, or via a third element.

As used in connection with various embodiments of the disclosure, the term “module” may include a unit implemented in hardware, software, or firmware, and may interchangeably be used with other terms, for example, “logic,” “logic block,” “part,” or “circuitry”. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 740) including one or more instructions that are stored in a storage medium (e.g., internal memory 736 or external memory 738) that is readable by a machine (e.g., the electronic device 701). For example, a processor (e.g., the processor 720) of the machine (e.g., the electronic device 701) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term “non-transitory” simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer’s server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 18:
FIG. 18 is a block diagram illustrating a camera module, according to an embodiment of the disclosure.
Figure 18:
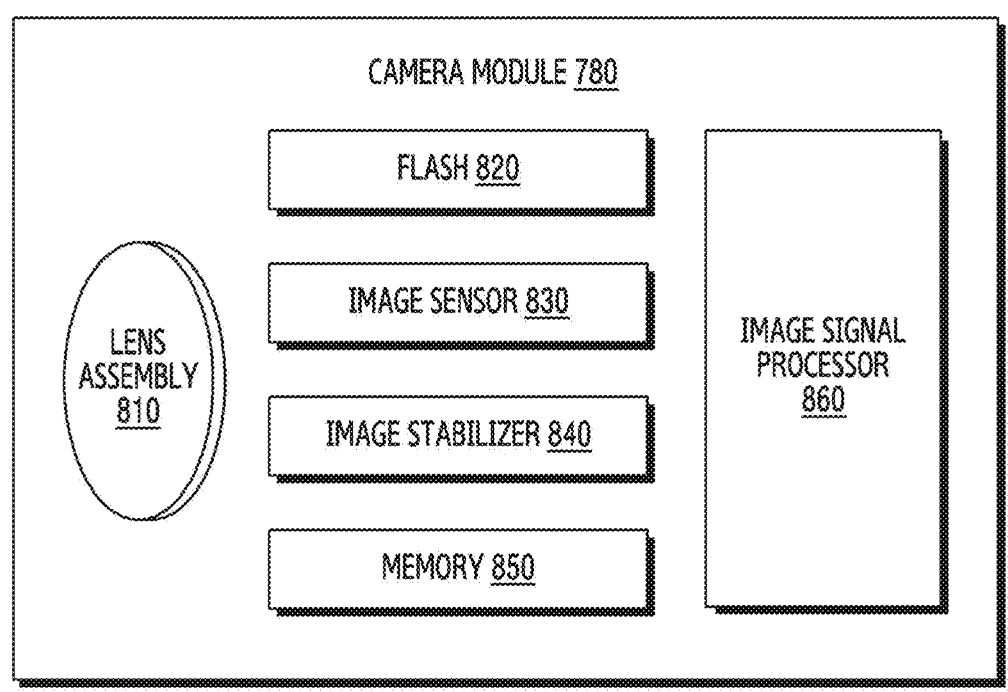

FIG. 18 is a block diagram 800 illustrating the camera module 780 according to an embodiment of the disclosure.

Referring to FIG. 18, the camera module 780 may include a lens assembly 810, a flash 820, an image sensor 830, an image stabilizer 840, memory 850 (e.g., buffer memory), or an image signal processor 860. The lens assembly 810 may collect light emitted or reflected from an object whose image is to be taken. The lens assembly 810 may include one or more lenses. According to an embodiment, the camera module 780 may include a plurality of lens assemblies 810. In such a case, the camera module 780 may form, for example, a dual camera, a 360-degree camera, or a spherical camera. Some of the plurality of lens assemblies 810 may have the same lens attribute (e.g., view angle, focal length, auto-focusing, f number, or optical zoom), or at least one lens assembly may have one or more lens attributes different from those of another lens assembly. The lens assembly 810 may include, for example, a wide-angle lens or a telephoto lens.

The flash 820 may emit light that is used to reinforce light reflected from an object. According to an embodiment, the flash 820 may include one or more light emitting diodes (LEDs) (e.g., a red-green-blue (RGB) LED, a white LED, an infrared (IR) LED, or an ultraviolet (UV) LED) or a xenon lamp. The image sensor 830 may obtain an image corresponding to an object by converting light emitted or reflected from the object and transmitted via the lens assembly 810 into an electrical signal. According to an embodiment, the image sensor 830 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 830 may be implemented using, for example, a charged coupled device (CCD) sensor or a complementary metal oxide semiconductor (CMOS) sensor.

The image stabilizer 840 may move the image sensor 830 or at least one lens included in the lens assembly 810 in a particular direction, or control an operational attribute (e.g., adjust the read-out timing) of the image sensor 830 in response to the movement of the camera module 780 or the electronic device 701 including the camera module 780. This allows compensating for at least part of a negative effect (e.g., image blurring) by the movement on an image being captured. According to an embodiment, the image stabilizer 840 may sense such a movement by the camera module 780 or the electronic device 701 using a gyro sensor (not shown) or an acceleration sensor (not shown) disposed inside or outside the camera module 780. According to an embodiment, the image stabilizer 840 may be implemented, for example, as an optical image stabilizer. The memory 850 may store, at least temporarily, at least part of an image obtained via the image sensor 830 for a subsequent image processing task. For example, if image capturing is delayed due to shutter lag or multiple images are quickly captured, a raw image obtained (e.g., a Bayer-patterned image, a high-resolution image) may be stored in the memory 850, and its corresponding copy image (e.g., a low-resolution image) may be previewed via the display module 760. Thereafter, if a specified condition is met (e.g., by a user's input or system command), at least part of the raw image stored in the memory 850 may be obtained and processed, for example, by the image signal processor 860. According to an embodiment, the memory 850 may be configured as at least part of the memory 730 or as a separate memory that is operated independently from the memory 730.

The image signal processor 860 may perform one or more image processing with respect to an image obtained via the image sensor 830 or an image stored in the memory 850. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 860 may perform control (e.g., exposure time control or read-out timing control) with respect to at least one (e.g., the image sensor 830) of the components included in the camera module 780. An image processed by the image signal processor 860 may be stored back in the memory 850 for further processing, or may be provided to an external component (e.g., the memory 730, the display module 760, the electronic device 702, the electronic device 704, or the server 708) outside the camera module 780. According to an embodiment, the image signal processor 860 may be configured as at least part of the processor 720, or as a separate processor that is operated independently from the processor 720. If the image signal processor 860 is configured as a separate processor from the processor 720, at least one image processed by the image signal processor 860 may be displayed, by the processor 720, via the display module 760 as it is or after being further processed.

According to an embodiment, the electronic device 701 may include a plurality of camera modules 780 having different attributes or functions. In such a case, at least one of the plurality of camera modules 780 may form, for example, a wide-angle camera and at least another of the plurality of camera modules 780 may form a telephoto camera. Similarly, at least one of the plurality of camera modules 780 may form, for example, a front camera and at least another of the plurality of camera modules 780 may form a rear camera.

A camera module (e.g., the camera module 100) according to an embodiment of the disclosure may include a lens assembly (e.g., the lens assembly 110) aligned along an optical axis, an image sensor (e.g., the image sensor 181) for changing an image to an electrical signal, an OIS driving unit for providing force for the lens assembly or the image sensor to move in a direction perpendicular to the optical axis or to rotate based on the optical axis, and a housing for accommodating the lens assembly, the image sensor and the OIS driving unit. The OIS driving unit may include an OIS carrier for moving in the direction perpendicular to the optical axis or rotating based on the optical axis and transporting the lens assembly or the image sensor based on the movement of the OIS driving unit, a plurality of first axis drive coils (e.g., the first drive coil 1621, the second drive coil 1622) disposed on a first side of the housing, a first magnet (e.g., the first magnet 141) having at least two polarities, and disposed on the OIS carrier to face the plurality of the first axis drive coils, at least two first position sensors (e.g., the first position sensor a 1623, the first position sensor b 1624) disposed at coil centers of at least two drive coils respectively among the plurality of the first axis drive coils, and configured to acquire first information for measuring a position of the first magnet for a first axis direction of the OIS driving unit, and at least one second position sensor (e.g., the second position sensor 1633) configured to acquire second information for measuring a position of the first magnet for a second axis direction of the OIS driving unit. The at least one second position sensor may be disposed on the first side of the housing to face one or more neutral zones of the first magnet.

In an embodiment, the OIS driving unit may further include at least one second axis drive coil (e.g., the third drive coil 1631, the fourth drive coil 1632) disposed on a second side of the housing perpendicular to the first side, and a second magnet (e.g., the second magnet 142) having at least one polarity, and disposed on the OIS carrier to face the at least one second axis drive coil.

In an embodiment, the camera module may further include an AF driving unit which provides force for the lens assembly or the image sensor to move along the optical axis for AF control. The AF driving unit may include an AF carrier for moving the lens assembly or the image sensor along the optical axis, an AF drive coil (e.g., the AF drive coil 164) disposed on a fourth side of the housing perpendicular to the first side and facing the second side, an AF magnet (e.g., the AF magnet 151) having at least one polarity, and disposed on the AF carrier to face the AF drive coil, and a third position sensor disposed on an inner side or an outer side of the AF drive coil, and configured to acquire third information for measuring the position of the AF magnet.

In an embodiment, the camera module may further include an AF driving unit which provides force for the lens assembly or the image sensor to move along the optical axis for AF control. The AF driving unit may include an AF carrier for moving the lens assembly or the image sensor along the optical axis, an AF drive coil disposed on a third side of the housing perpendicular to the first side and facing the second side, an AF magnet having at least one polarity, and disposed on the AF carrier to face the AF drive coil, and a third position sensor disposed on an inner side or an outer side of the AF drive coil, and configured to acquire third information for measuring the position of the AF magnet.

In an embodiment, the OIS driving unit may further include at least one second axis drive coil disposed on a third side of the housing facing the first side, and at least one second magnet having at least one polarity, and disposed in the housing to face the at least one second axis drive coil.

In an embodiment, the camera module may further include an AF driving unit which provides force for the lens assembly or the image sensor to move along the optical axis for AF control. The AF driving unit may include an AF carrier for moving the lens assembly or the image sensor along the optical axis, an AF drive coil disposed on a second side or a fourth side of the housing perpendicular to the first side and the third side, an AF magnet having at least one polarity, and disposed on the AF carrier to face the AF drive coil, and a third position sensor disposed on an inner side or an outer side of the AF drive coil, and configured to acquire third information for measuring the position of the AF magnet.

In an embodiment, the at least two first position sensors may measure a magnetic flux density of the first magnet, and acquire the first information for measuring the position of the first magnet for a first axis direction of the OIS driving unit based on a variation of the measured magnetic flux density.

In an embodiment, the OIS driving unit may further include at least one first axis drive circuit electrically connected to a plurality of first axis drive coils. The at least one first axis drive circuit may control the OIS carrier to move in a first axis direction of the OIS driving unit on a plane perpendicular to the optical axis or to rotate about the optical axis, by controlling a current applied to at least one of the plurality of the first axis drive coils based on the measured position of the first magnet.

In an embodiment, the at least one first axis drive circuit may be embedded in the at least two first position sensors or configured as a separate module independent from the at least two first position sensors.

In an embodiment, the at least one second position sensor each may include a plurality of sensing elements separately disposed at a designated position of each second position sensor.

In an embodiment, the at least one second position sensor may detect a magnetic flux density of the first magnet using the plurality of the sensing elements, and measure the position of the first magnet for a second axis direction of the OIS driving unit based on a variation of the detected magnetic flux density.

In an embodiment, the OIS driving unit may further include at least one second axis drive circuit electrically connected to at least one second axis drive coil. The at least one second axis drive circuit may move the OIS carrier in a second axis direction of the OIS driving unit on a plane perpendicular to the optical axis, by controlling a current applied to the at least one second axis drive coil based on the measured position of the first magnet.

In an embodiment, the at least one second axis drive circuit may be embedded in the at least one second position sensor or configured as a separate module independent from the at least one second position sensor.

In an embodiment, the OIS driving unit may further include a printed circuit board surrounding at least portion of a side of the housing. The printed circuit board may include a first axis drive coil, a second axis drive coil and an AF drive coil disposed on an inner side of the printed circuit board.

In an embodiment, the camera module may further include a stopper disposed on an upper side or a lower side of the OIS carrier and preventing separation of the OIS carrier.

An electronic device (e.g., the electronic device 701) according to an embodiment may include at least one camera module (e.g., the camera module 100). The at least one camera module may include a lens assembly (e.g., the lens assembly 110) aligned along an optical axis, an image sensor (e.g., the image sensor 181) for changing an image to an electrical signal, an OIS driving unit for providing force for the lens assembly or the image sensor to move in a direction perpendicular to the optical axis or to rotate about the optical axis, and a housing for accommodating the lens assembly, the image sensor and the OIS driving unit. The OIS driving unit may include an OIS carrier for moving in the direction perpendicular to the optical axis or rotating based on the optical axis and transporting the lens assembly or the image sensor based on the movement of the OIS driving unit, a plurality of first axis drive coils (e.g., the first drive coil 1621, the second drive coil 1622) disposed on a first side of the housing, a first magnet (e.g., the first magnet 141) having at least two polarities, and disposed on the OIS carrier to face the plurality of the first axis drive coils, at least two first position sensors (e.g., the first position sensor a 1623, the first position sensor b 1624) disposed at coil centers of at least two drive coils respectively among the plurality of the first axis drive coils and configured to acquire first information for measuring a position of the first magnet for a first axis direction of the OIS driving unit, at least one second axis drive coil (e.g., the third drive coil 1631, the fourth drive coil 1632) disposed on a second side of the housing perpendicular to the first side, a second magnet (e.g., the second magnet 142) having at least one polarity, and disposed on the OIS carrier to face the at least one second axis drive coil, and at least one second position sensor (e.g., the second position sensor 1633) configured to acquire second information for measuring the position of the first magnet for a second axis direction of the OIS driving unit. The at least one second position sensor may be disposed on the first side of the housing to face one or more neutral zones of the first magnet.

In an embodiment, the camera module may further include an AF driving unit which provides force for the lens assembly or the image sensor to move along the optical axis for AF control. The AF driving unit may include an AF carrier for moving the lens assembly or the image sensor along the optical axis, an AF drive coil (e.g., the AF drive coil 164) disposed on a fourth side of the housing perpendicular to the first side and facing the second side, an AF magnet (e.g., the AF magnet 151) having at least one polarity, and disposed on the AF carrier to face the AF drive coil, and a third position sensor disposed on an inner side or an outer side of the AF drive coil and configured to acquire third information for measuring the position of the AF magnet.

In an embodiment, the at least two first position sensors may measure the position of the first magnet for a first axis direction of the OIS driving unit based on a magnetic flux density variation detected for the first magnet, and control the OIS carrier to move in a first axis direction of the OIS driving unit on a plane perpendicular to the optical axis or to rotate about the optical axis, by controlling a current applied to at least one of the plurality of the first axis drive coils based on the measured position of the first magnet.

According to an embodiment, the at least one second position sensor each may include a plurality of sensing elements separately disposed at a designated position of each second position sensor.

In an embodiment, the at least one second position sensor may measure the position of the first magnet for a second axis direction of the OIS driving unit based on a magnetic flux density variation detected for the first magnet using the plurality of the sensing elements, and control the OIS carrier to move in a second axis direction of the OIS driving unit on a plane perpendicular to the optical axis, by controlling a current applied to at least one second axis drive coil based on the measured position of the first magnet.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. At least one camera module disposed in an electronic device, the at least one camera module comprising:

a lens assembly aligned along an optical axis;

an image sensor for changing an image to an electrical signal;

an optical image stabilization (OIS) driving unit for providing force for the lens assembly or the image sensor to move in a direction perpendicular to the optical axis or to rotate about the optical axis; and a housing for accommodating the lens assembly, the image sensor and the OIS driving unit, wherein the OIS driving unit comprises:

an OIS carrier for moving in the direction perpendicular to the optical axis or rotating about the optical axis, the OIS carrier transports the lens assembly or the image sensor based on the movement of the OIS driving unit, a plurality of first axis drive coils disposed on a first side of the housing, a first magnet having at least two polarities, and disposed on the OIS carrier to face the plurality of the first axis drive coils, at least two first position sensors disposed at coil centers of at least two drive coils respectively among the plurality of the first axis drive coils, and configured to acquire first information for measuring a position of the first magnet for a first axis direction of the OIS driving unit, and at least one second position sensor configured to acquire second information for measuring a position of the first magnet for a second axis direction of the OIS driving unit, and wherein the at least one second position sensor is disposed on the first side of the housing to face one or more neutral zones of the first magnet.

2. The at least one camera module of claim 1, wherein the OIS driving unit further comprises:

at least one second axis drive coil disposed on a second side of the housing perpendicular to the first side; and a second magnet having at least one polarity, and disposed on the OIS carrier to face the at least one second axis drive coil.

3. The at least one camera module of claim 2, further comprising:

an auto focus (AF) driving unit which provides force for the lens assembly or the image sensor to move along the optical axis for AF control, wherein the AF driving unit comprises:

an AF carrier for moving the lens assembly or the image sensor along the optical axis, an AF drive coil disposed on a fourth side of the housing perpendicular to the first side and facing the second side, an AF magnet having at least one polarity, and disposed on the AF carrier to face the AF drive coil, and a third position sensor disposed on an inner side or an outer side of the AF drive coil, and configured to acquire third information for measuring the position of the AF magnet.

4. The at least one camera module of claim 2, further comprising:

an AF driving unit which provides force for the lens assembly or the image sensor to move along the optical axis for AF control, wherein the AF driving unit comprises:

an AF carrier for moving the lens assembly or the image sensor along the optical axis, an AF drive coil disposed on a third side of the housing perpendicular to the first side and facing the second side, an AF magnet having at least one polarity, and disposed on the AF carrier to face the AF drive coil, and a third position sensor disposed on an inner side or an outer side of the AF drive coil, and configured to acquire third information for measuring the position of the AF magnet.

5. The at least one camera module of claim 1, wherein the OIS driving unit further comprises:

at least one second axis drive coil disposed on a third side of the housing facing the first side; and at least one second magnet having at least one polarity, and disposed in the housing to face the at least one second axis drive coil.

6. The at least one camera module of claim 5, further comprising:

an AF driving unit which provides force for the lens assembly or the image sensor to move along the optical axis for AF control, wherein the AF driving unit comprises:

an AF carrier for moving the lens assembly or the image sensor along the optical axis, an AF drive coil disposed on a second side or a fourth side of the housing perpendicular to the first side and the third side, an AF magnet having at least one polarity, and disposed on the AF carrier to face the AF drive coil, and a third position sensor disposed on an inner side or an outer side of the AF drive coil, and configured to acquire third information for measuring the position of the AF magnet.

7. The at least one camera module of claim 1, wherein the at least two first position sensors:

measure a magnetic flux density of the first magnet; and acquire the first information for measuring the position of the first magnet for a first axis direction of the OIS driving unit based on a variation of the measured magnetic flux density.

8. The at least one camera module of claim 7, wherein the OIS driving unit further comprises at least one first axis drive circuit electrically connected to a plurality of first axis drive coils, and wherein the at least one first axis drive circuit controls the OIS carrier to move in a first axis direction of the OIS driving unit on a plane perpendicular to the optical axis or to rotate about the optical axis, by controlling a current applied to at least one of the plurality of the first axis drive coils based on the measured position of the first magnet.

9. The at least one camera module of claim 8, wherein the at least one first axis drive circuit is embedded in the at least two first position sensors or configured as a separate module independent from the at least two first position sensors.

10. The at least one camera module of claim 1, wherein the at least one second position sensor each comprises a plurality of sensing elements separately disposed at a designated position of each second position sensor.

11. The at least one camera module of claim 10, wherein the at least one second position sensor:

detects a magnetic flux density of the first magnet using the plurality of the sensing elements; and acquire the second information for measuring the position of the first magnet for a second axis direction of the OIS driving unit based on a variation of the detected magnetic flux density.

12. The at least one camera module of claim 11, wherein the OIS driving unit further comprises at least one second axis drive circuit electrically connected to at least one second axis drive coil, and wherein the at least one second axis drive circuit moves the OIS carrier in a second axis direction of the OIS driving unit on a plane perpendicular to the optical axis, by controlling a current applied to the at least one second axis drive coil based on the measured position of the first magnet.

13. The at least one camera module of claim 12, wherein the at least one second axis drive circuit is embedded in the at least one second position sensor or configured as a separate module independent from the at least one second position sensor.

14. The at least one camera module of claim 1, wherein the OIS driving unit further comprises a printed circuit board surrounding at least a portion of a side of the housing, and wherein the printed circuit board comprises a first axis drive coil, a second axis drive coil and an AF drive coil disposed on an inner side of the printed circuit board.

15. The at least one camera module of claim 1, further comprising:

a stopper disposed on an upper side or a lower side of the OIS carrier for preventing separation of the OIS carrier.

16. An electronic device comprising:

at least one camera module, wherein the at least one camera module comprises:

a lens assembly aligned along an optical axis, an image sensor for changing an image to an electrical signal, an optical image stabilization (OIS) driving unit for providing force for the lens assembly or the image sensor to move in a direction perpendicular to the optical axis or to rotate about the optical axis, and a housing for accommodating the lens assembly, the image sensor and the OIS driving unit, wherein the OIS driving unit comprises:

an OIS carrier for moving in the direction perpendicular to the optical axis or rotating about the optical axis, the OIS carrier transports the lens assembly or the image sensor based on the movement of the OIS driving unit, a plurality of first axis drive coils disposed on a first side of the housing, a first magnet having at least two polarities, and disposed on the OIS carrier to face the plurality of the first axis drive coils, at least two first position sensors disposed at coil centers of at least two drive coils respectively among the plurality of the first axis drive coils, configured to acquire first information for measuring a position of the first magnet for a first axis direction of the OIS driving unit, at least one second axis drive coil disposed on a second side of the housing perpendicular to the first side, a second magnet having at least one polarity, and disposed on the OIS carrier to face the at least one second axis drive coil, and at least one second position sensor configured to acquire second information for measuring the position of the first magnet for a second axis direction of the OIS driving unit, and wherein the at least one second position sensor is disposed on the first side of the housing to face one or more neutral zones of the first magnet.

17. The electronic device of claim 16, further comprising:

an auto focus (AF) driving unit which provides force for the lens assembly or the image sensor to move along the optical axis for AF control, wherein the AF driving unit comprises:

an AF carrier for moving the lens assembly or the image sensor along the optical axis, an AF drive coil disposed on a fourth side of the housing perpendicular to the first side and facing the second side, an AF magnet having at least one polarity, and disposed on the AF carrier to face the AF drive coil, and a third position sensor disposed on an inner side or an outer side of the AF drive coil, and configured to acquire third information for measuring the position of the AF magnet.

18. The electronic device of claim 17, wherein the at least two first position sensors measure the position of the first magnet for a first axis direction of the OIS driving unit based on a magnetic flux density variation detected for the first magnet, and wherein the OIS driving unit controls the OIS carrier to move in a first axis direction of the OIS driving unit on a plane perpendicular to the optical axis or to rotate about the optical axis, by controlling a current applied to at least one of the plurality of the first axis drive coils based on the measured position of the first magnet.

19. The electronic device of claim 17, wherein the at least one second position sensor each comprises a plurality of sensing elements separately disposed at a designated position of each second position sensor.

20. The electronic device of claim 19, wherein the at least one second position sensor measures the position of the first magnet for a second axis direction of the OIS driving unit based on a magnetic flux density variation detected for the first magnet using the plurality of the sensing elements, and wherein the OIS driving unit controls the OIS carrier to move in a second axis direction of the OIS driving unit on a plane perpendicular to the optical axis, by controlling a current applied to at least one second axis drive coil based on the measured position of the first magnet.

* * * * *